United States Patent
Joseph et al.

(10) Patent No.: US 8,351,421 B2
(45) Date of Patent: Jan. 8, 2013

(54) SYSTEM AND METHOD FOR VOICE OVER INTERNET PROTOCOL (VOIP) AND FACSIMILE OVER INTERNET PROTOCOL (FOIP) CALLING OVER THE INTERNET

(75) Inventors: Ajay Joseph, Lexington, MA (US); Hwan Tang, Acton, MA (US); Lizhong Zhang, Westford, MA (US); Paul A. Skelly, Needhamm, MA (US)

(73) Assignee: iBasis, Inc., Burlington, MA (US)

( * ) Notice: Subject to any disclaimer, the term of this patent is extended or adjusted under 35 U.S.C. 154(b) by 701 days.

(21) Appl. No.: 12/434,838

(22) Filed: May 4, 2009

(65) Prior Publication Data
US 2009/0213846 A1 Aug. 27, 2009

Related U.S. Application Data

(62) Division of application No. 10/298,208, filed on Nov. 18, 2002, now Pat. No. 7,529,225.

(60) Provisional application No. 60/331,479, filed on Nov. 16, 2001.

(51) Int. Cl.
*H04L 12/66* (2006.01)

(52) U.S. Cl. ........ 370/352; 370/353; 370/354; 370/355; 370/356

(58) Field of Classification Search ........................ None
See application file for complete search history.

(56) References Cited

U.S. PATENT DOCUMENTS

| | | | | |
|---|---|---|---|---|
| 4,979,118 A | * | 12/1990 | Kheradpir | 701/117 |
| 5,291,550 A | * | 3/1994 | Levy et al. | 379/242 |
| 5,452,294 A | | 9/1995 | Natarajan | |
| 5,790,546 A | | 8/1998 | Dobbins et al. | |
| 5,970,064 A | | 10/1999 | Clark et al. | |
| 5,995,487 A | * | 11/1999 | Weaver et al. | 370/395.21 |
| 6,084,858 A | | 7/2000 | Matthews et al. | |
| 6,269,157 B1 | | 7/2001 | Coyle | |
| 6,292,481 B1 | | 9/2001 | Voit et al. | |
| 6,363,056 B1 | | 3/2002 | Beigi et al. | |
| 6,373,929 B1 | | 4/2002 | Johnson et al. | |

(Continued)

OTHER PUBLICATIONS

"An Introduction to NeTrueQoSJ Demo," *NeTrue Communications, Inc.*, V2.1: 1-20 (Feb. 2000).

(Continued)

*Primary Examiner* — Otis L Thompson, Jr.
(74) *Attorney, Agent, or Firm* — Nixon & Vanderhye P.C.

(57) ABSTRACT

A system and method for sending long distance telephone calls over the Internet utilizes cost and quality of service data to optimize system performance and to minimize the cost of completing the calls. The system utilizes a network of gateways connected to the Internet. The gateways receive calls from various service providers and convert the analog calls into data packets which are then placed onto the Internet. Similarly, the gateways take data packets off the Internet, convert the data packets back into analog format, and provide the analog telephone calls to the same or another service provider. Then system periodically checks the quality of communications between each of the gateways, and uses this information, in combination with cost information, to determine how to route the calls over the Internet. Special addressing protocols can be used by a system embodying the invention to reduce or eliminate unnecessary signaling between gateways as call setup procedures are carried out. The system can also use information about calls that has been recorded in more than one location to determine how much to charge for completing a call.

16 Claims, 14 Drawing Sheets

U.S. PATENT DOCUMENTS

| | | | |
|---|---|---|---|
| 6,473,499 | B1 | 10/2002 | Ng et al. |
| 6,480,588 | B1 | 11/2002 | Donovan |
| 6,480,898 | B1 | 11/2002 | Scott et al. |
| 6,556,565 | B1 | 4/2003 | Ward et al. |
| 6,631,119 | B1 | 10/2003 | Mawhinney et al. |
| 6,678,267 | B1 | 1/2004 | Anandakumar et al. |
| 6,721,334 | B1 | 4/2004 | Ketchem |
| 6,775,267 | B1 | 8/2004 | Kung et al. |
| 6,868,094 | B1 | 3/2005 | Bordonaro et al. |
| 7,529,225 | B2 | 5/2009 | Joseph |
| 7,698,182 | B2 * | 4/2010 | Falcone et al. .......... 705/35 |
| 2001/0050911 | A1 | 12/2001 | Eastman |
| 2002/0101967 | A1 | 8/2002 | Eng et al. |
| 2002/0150111 | A1 * | 10/2002 | Marce .......... 370/401 |
| 2003/0012356 | A1 * | 1/2003 | Zino et al. .......... 379/219 |
| 2004/0047345 | A1 | 3/2004 | Joseph et al. |
| 2004/0125935 | A1 * | 7/2004 | Enzmann et al. .......... 379/221.01 |
| 2004/0174880 | A1 | 9/2004 | White et al. |

OTHER PUBLICATIONS

Internet Engineering Task Force RFC 1773 [online], Mar. 1995 [retrieved on Oct. 9, 2000]. Retrieved from the Internet URL:http://blitzen.canberra.edu.au/RFC/rfc/rfc1773.html.

Internet Engineering Task Force RFC 1774 [online], Mar. 1995 [retrieved on Oct. 9, 2000]. Retrieved from the Internet URL:http://blitzen.canberra.edu.au/RFC/rfc/rfc1774.html.

Internet Engineering Task Force RFC 1772 [online], Mar. 1995 [retrieved on Oct. 9, 2000]. Retrieved from the Internet URL:http://blitzen.canberra.edu.au/RFC/rfc/rfc1772.html.

Internet Engineering Task Force RFC 1771 [online], Mar. 1995 [retrieved on Oct. 9, 2000]. Retrieved from the Internet URL:http://blitzen.canberra.edu.au/RFC/rfc/rfc1771.html.

Internet Engineering Task Force RFC 768 [online], Aug. 1980 [retrieved on Jan. 20, 2001]. Retrieved from the Internet URL:http://blitzen.ise.canberra.edu.au/RFC/rfc/rfc768.html.

Internet Engineering Task Force RFC 1889 [online], Jan. 1996 [retrieved on Jan. 20, 2001]. Retrieved from the Internet URL:http://blitzen.ise.canberra.edu.au/RFC/rfc/rfc1889.html.

Savage, Stefan, et al., "Detour: Informed Internet Routing and Transport," *IEEE MICRO*, pp. 50-59 (Jan.-Feb. 1999).

Collins, Andy, "The Detour Framework for Packet Rerouting," pp. 1-20 (Oct. 29, 1998).

Kim, D. H. et al., "A New Routing Control Technique Using Active Temporal Data Management," *J. of Systems and Software*, 51: 37-48 (2000).

"Internet Service Exchange: A Network Better by Design," *AboveNet Communications Inc.* (1999).

Perkins, M.E., et al., "Speech Transmission Performance Planning in Hybrid IP/SCN Networks," *IEEE Communications Magazine*, pp. 126-131 (Jul. 1999).

* cited by examiner

GATEWAYS

| | A | B | C | D | E | F | G | H | I | J |
|---|---|---|---|---|---|---|---|---|---|---|
| A | X | 1.3 | 2 | 1.8 | 1 | 2 | 2.2 | 3 | 1.7 | 8 |
| B | 0.9 | X | 3 | 1 | 1.6 | 7 | 1 | X | 1.3 | 2 |
| C | X | 2 | X | 2 | X | 1.7 | 1.8 | 6 | 5 | 5 |
| D | X | X | X | X | X | X | 1.2 | 1.8 | 3 | 2 |
| E | 1.6 | 1.8 | 2 | 3 | X | 7 | 1 | 2.2 | 3 | 1 |
| F | X | 2 | 3 | 1 | 1.1 | X | 1.1 | X | X | X |
| G | 2.2 | 2.2 | 2.8 | 2.1 | 3 | X | X | X | X | X |
| H | 1.4 | 1.3 | 1.1 | 1.4 | 1.2 | 3 | 1 | X | 8 | 8 |
| I | 3.2 | 3.4 | 3.1 | 4 | 4.1 | 4.8 | 3 | 1.2 | X | 3 |
| J | 2.1 | 2.2 | 7 | X | X | X | 3.1 | 8 | 9 | X |

GATEWAYS (row labels)

Fig. 11

SYSTEM AND METHOD FOR VOICE OVER INTERNET PROTOCOL (VOIP) AND FACSIMILE OVER INTERNET PROTOCOL (FOIP) CALLING OVER THE INTERNET

This application is a divisional of U.S. Utility application Ser. No. 10/298,208, filed Nov. 18, 2002, now issued at U.S. Pat. No. 7,529,225, This application also claims priority to U.S. Provisional Patent Application Ser. No. 60/331,479, filed Nov. 16, 2001, and U.S. Utility application Ser. No. 10/094,671, filed Mar. 7, 2002, now U.S. Pat. No. 7,391,731, issued Jun. 24, 2008, the disclosure of all of which are hereby incorporated by reference.

BACKGROUND OF THE INVENTION

1. Field of the Invention

The invention relates generally to the field of communications, and more Specifically to a network configured for Voice over Internet Protocol (VoIP) and/or Facsimile over Internet Protocol (FoIP).

2. Background of the Related Art

Historically, most wired voice communications were carried over the Public Switched Telephone Network (PSTN), which relies on switches to establish a dedicated circuit between a source and a destination to carry an analog voice signal. More recently, Voice over Internet Protocol (VoIP) was developed as a means for enabling speech communication using digital, packet-based, Internet Protocol (IP) networks such as the Internet. A principle advantage of IP is its efficient bandwidth utilization. VoIP may also be advantageous where it is beneficial to carry related voice and data communications over the same channel, to bypass tolls associated with the PSTN, to interface communications originating with Plain Old Telephone Service (POTS) with applications on the Internet, or for other reasons. As discussed in this specification, the problems and solutions related to VoIP may also apply to Facsimile over Internet Protocol (FoIP).

FIG. 1 is a schematic diagram of a representative architecture in the related art for VoIP communications between originating telephone 100 and destination telephone 145. In alternative embodiments, there may be multiple instances of each feature or component shown in FIG. 1. For example, there may be multiple gateways 125 controlled by a single controller 120. There may also be multiple controllers 120 and multiple PSTN's 115. Hardware and software components for the features shown in FIG. 1 are well-known. For example, controllers 120 and 160 may be Cisco SC2200 nodes, and gateways 125 and 135 may be Cisco AS5300 voice gateways.

To initiate a VoIP session, a user lifts a handset from the hook of originating telephone 100. A dial tone is returned to the originating telephone 100 via Private Branch Exchange (PBX) 110. The user dials a telephone number, which causes the PSTN 115 to switch the call to the originating gateway 125, and additionally communicates a destination for the call to the originating gateway 125. The gateway will determine which destination gateway a call should be sent to using a look-up table resident within the gateway 125, or it may consult the controller 120 for this information.

The gateway then attempts to establish a call with the destination telephone 145 via the VoIP network 130, the destination gateway 135, signaling lines 155 and the PSTN 140. If the destination gateway and PSTN are capable of completing the call, the destination telephone 145 will ring. When a user at the destination telephone 145 lifts a handset and says "hello?" a first analog voice signal is transferred through the PSTN 140 to the destination gateway 135 via lines 155. The destination gateway 135 converts the first analog voice signal originating at the destination telephone 145 into packetized digital data (not shown) and appends a destination header to each data packet. The digital data packets may take different routes through the VoIP network 130 before arriving at the originating gateway 125. The originating gateway 125 assembles the packets in die correct order, converts the digital data to a second analog voice signal (which should be a "hello?" substantially similar to the first analog signal), and forwards the second analog voice signal to the originating telephone 100 via lines 155, PSTN 115 and PBX 110. A user at the originating telephone 100 can speak to a user at the destination telephone 145 in a similar manner. The call is terminated when the handset of either the originating telephone 100 or destination telephone 145 is placed on the hook of the respective telephone. In the operational example described above, the telephone 105 is not used.

In the related art, the controllers 120 and 160 may provide signaling control in the PSTN and a limited means of controlling a gateway at one end of the call. It will be appreciated by those skilled in the art that, in some configurations, all or part of the function of the controllers 120 and 160 as described above may be embedded into the gateways 125 and 135, respectively.

VoIP in the related art presents several problems for a provider of network-based voice communication services. For example, because packets of information follow different routes between source and destination terminals in an IP network, it is difficult for network service providers to track data and bill for network use. In addition, VoIP networks in the related art lack adequate control schemes for routing packets through PSTNs, gateways and VoIP networks based upon the selected carrier service provider, a desired Quality of Service (QoS), cost, and other factors. Moreover, related art controllers do not provide sufficient interfaces between the large variety of signaling systems used in international communications. Other disadvantages related to monitoring and control also exist with present VoIP schemes.

SUMMARY OF THE INVENTION

An object of the invention is to solve at least one or more of the above problems and/or disadvantages in whole or in part and to provide at least the advantages described hereinafter.

Another object of the invention is to provide an improved ability to monitor VoIP and FoIP traffic through a network.

Another object of the invention is to provide an improved ability to identify the best routes for VoIP and FoIP traffic through a network based on a variety of considerations.

Another object of the invention is to provide an improved ability to provision a network in order to direct VoIP and FoIP traffic according to the identified best routes.

Another object of the invention is to simplify the generation of billing records related to VoIP and FoIP network services.

Another object of the invention is to improve the interface between networks having different signaling systems.

Another object of the invention if to provide improved acceptance/decline logic for determining whether to route traffic upon receipt of a routing request.

Another object of the invention is to provide a different quality of service to different classes of customers.

Another object of the invention is to provide an improved method for monitoring the quality of service of a VoIP network.

In order to achieve at least the above objectives in whole or in part and in accordance with the purposes of the invention, as embodied and broadly described, an improved control architecture for VoIP/FoIP communications is provided including the features of: a control signal interface to at least one gateway for routing VoIP/FoIP communications over an IP network. A gatekeeper may be coupled to the control signal interface, and control means coupled to the gatekeeper, wherein the control means is configured to receive a VoIP/FoIP routing request, determine a best route through the IP network, provision the IP network for the determined best route, and analyze traffic on the IP network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein:

FIG. 11 is a diagram of a matrix illustrating a method for organizing quality of service data for communications paths between gateways;

DETAILED DESCRIPTION OF PREFERRED EMBODIMENTS

Figure 1:
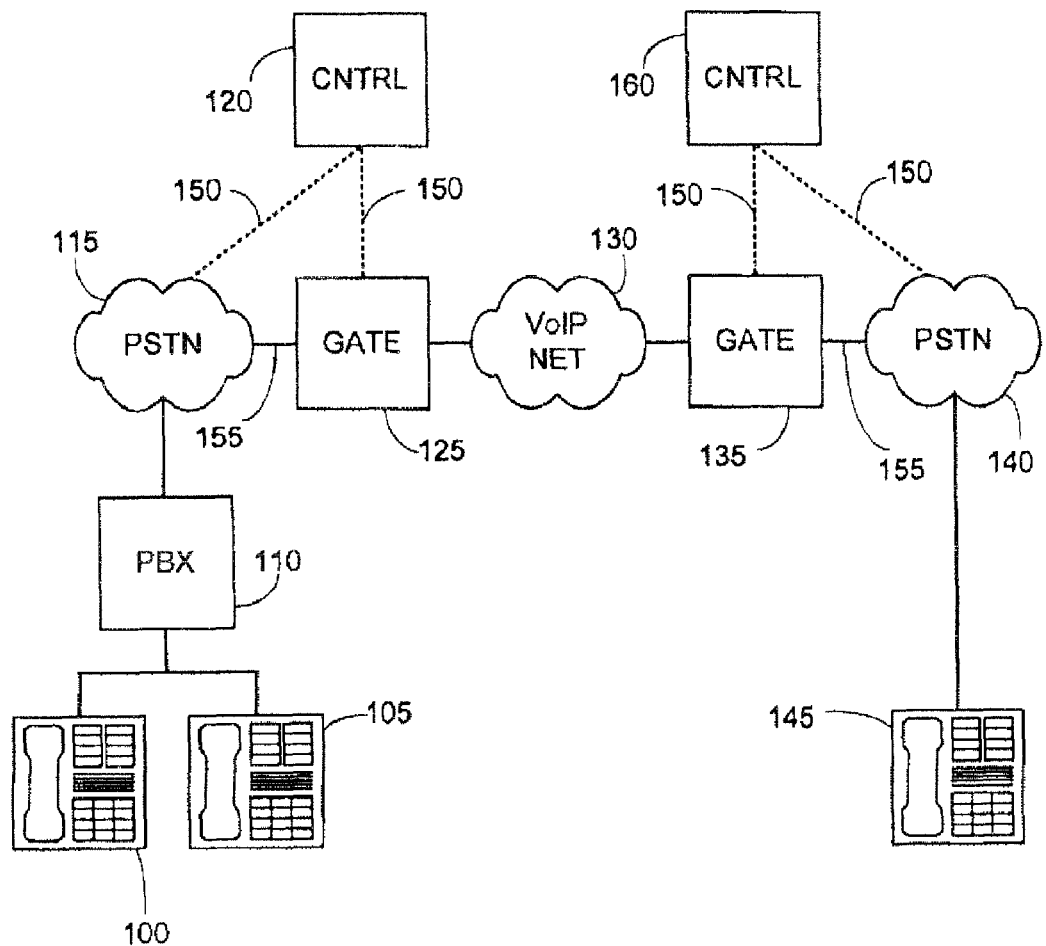
FIG. 1 is a schematic diagram of a system architecture providing VoIP communications, according to the background.
Figure 2:
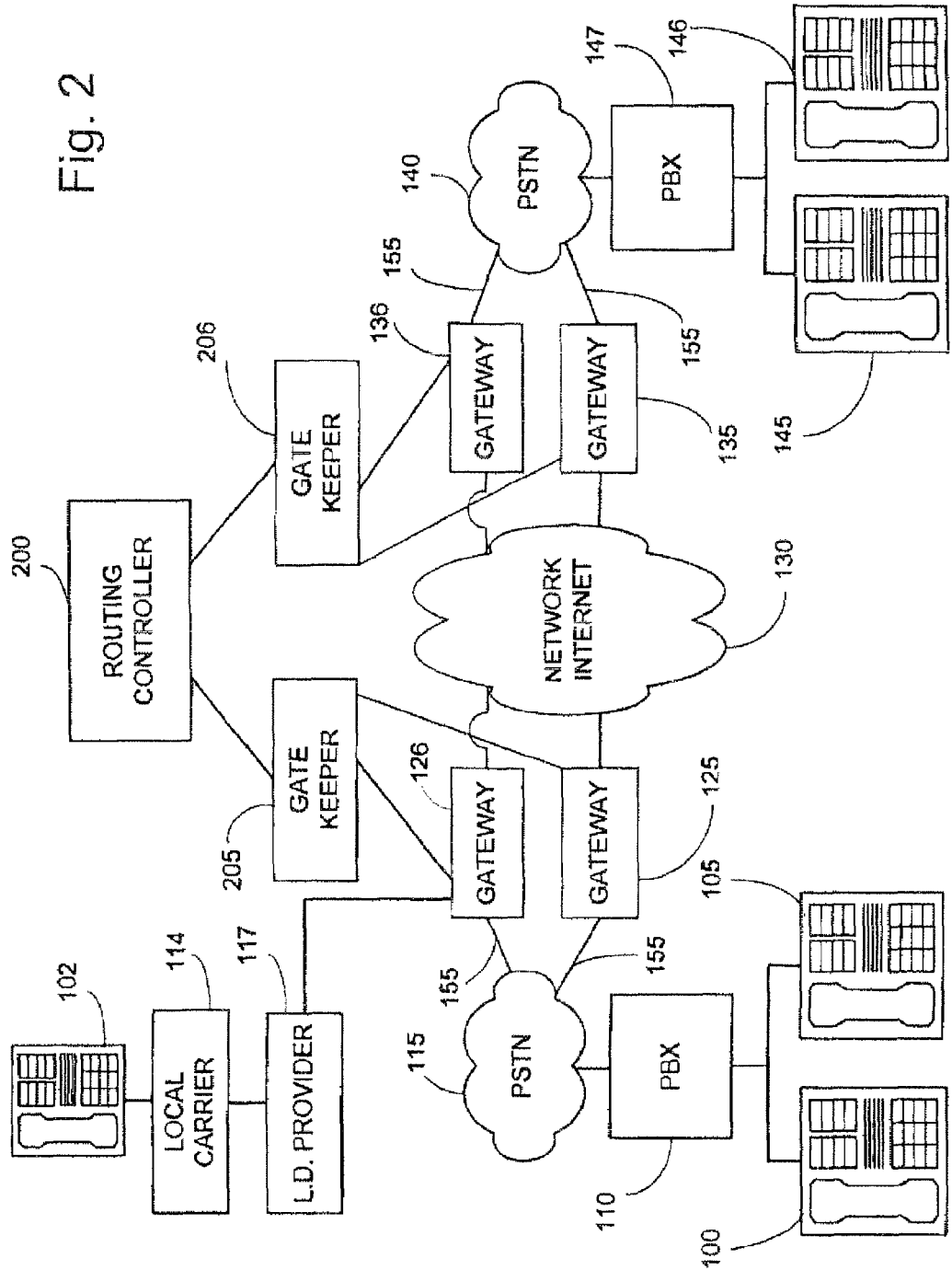
FIG. 2 is a schematic diagram of a system architecture providing VoIP/FoIP communications, according to a preferred embodiment of the invention.

A system embodying the invention is depicted in FIG. 2. The system includes telephones 100/105 connected to a private branch exchange (PBX) 110. The PBX, in turn, is connected to the PSTN 115. In addition, telephones 102 may be coupled to a local carrier 114, which in turn routes long distance calls to one or more long distance service providers 117. Those skilled in the art will recognize that calls could also originate from cellular telephones, computer based telephones, and/or other sources, and that those calls could also be routed through various carriers and service providers. Regardless of where the calls are originating from, they are ultimately forwarded to an originating gateway 125/126.

The originating gateways 125/126 function to convert an analog call into digital packets, which are then sent via the Internet 130 to a destination gateway 135/136. In some instances, the gateways may receive a call that has already been converted into a digital data packet format. In this case, the gateways will function to communicate the received data packets to the proper destination gateways. However, the gateways may modify the received data packets to include certain routing and other formatting information before sending the packets on to the destination gateways.

The gateways 125/126/135/136 are coupled to one or more gatekeepers 205/206. The gatekeepers 205/206 are coupled to a routing controller 200. Routing information used to inform the gateways about where packets should be sent originates at the routing controller.

One of skill in the art will appreciate that although a single routing controller 200 is depicted in FIG. 2, a system embodying the invention could include multiple routing controllers 200. In addition, one routing controller may be actively used by gatekeepers and gateways to provide routing information, while another redundant routing controller may be kept active, but unused, so that the redundant routing controller can step in should the primary routing controller experience a failure. As will also be appreciated by those skilled in the art, it may be advantageous for the primary and redundant routing controllers to be located at different physical locations so that local conditions affecting the primary controller are not likely to also result in failure of the redundant routing controller.

In a preferred embodiment of the invention, as depicted in FIG. 2, the digital computer network 130 used to communicate digital data packets between gateways may be compliant with the H.323 recommendation from the International Telecommunications Union (ITU). Use of H.323 may be advantageous for reasons of interoperability between sending and receiving points, because compliance with H.323 is not necessarily tied to any particular network, platform, or application, because H.323 allows for management of bandwidth, and for other reasons. Thus, in a preferred embodiment, one function of the originating gateways 125 and 126 and the terminating gateways 135 and 136 may be to provide a translation of data between the PSTN's 115/140 and the H.323-based VoIP network 130. Moreover, because H.323. is a framework document, H.225 protocol may be used for communication and signaling between the gateways 125/126 and 135/136, RTP protocol may be used for audio data between the gateways 125/126 and 135/136, and RAS (Registration, Admission, and Status) protocol may be used in communications with the gatekeepers 205/206.

According to the invention, the gatekeeper 205 may perform admission control, address translation, call signaling, call management, or other functions to enable the communication of voice and facsimile traffic over the PSTN networks 115/140 and the VoIP network 130. The ability to provide signaling for networks using Signaling System No. 7 (SS7) and other signaling types may be advantageous over network schemes that rely on gateways with significantly less capability. For example, related art gateways not linked to the gatekeepers of the present invention may only provide signaling for Multi-Frequency (MF), Integrated Services Digital Network (ISDN), or Dual Tone Multi-Frequency (DTMF), According to a preferred embodiment of the present invention, the gatekeeper 205 may further provide an interface between different gateways, and the routing controller 200. The gatekeeper 205 may transmit routing requests to the routing controller 200, receive an optimized route from the routing controller 200, and execute the route accordingly.

Persons skilled in the art of communications will recognize that gatekeepers may also communicate with other gatekeepers to manage calls outside of the originating gatekeeper's zone. Additionally, it may be advantageous to have multiple gatekeepers linking a particular gateway with a particular routing controller so that the gatekeepers may be used as alternates, allowing calls to continue to be placed to all available gateways in the event of failure of a single gatekeeper. Moreover, although the gatekeeping function may be logically separated from the gateway function, embodiments where the gatekeeping and gateway functions are combined onto a common physical host are also within the scope of the invention.

In a system embodying the present invention, as shown in FIG. 2, a routing controller 200 is logically coupled to gateways 125/126 and 135/136 through gatekeepers 205/206. The routing controller 200 contains features not included in the prior art signaling controllers 120 and 160 of the prior art systems described above, as will be described below. Routing controller 200 and gatekeepers 205/206 may be hosted on one or more network-based servers which may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Detailed descriptions of the functional portions of a typical routing controller embodying the invention is provided below.

Figure 3:
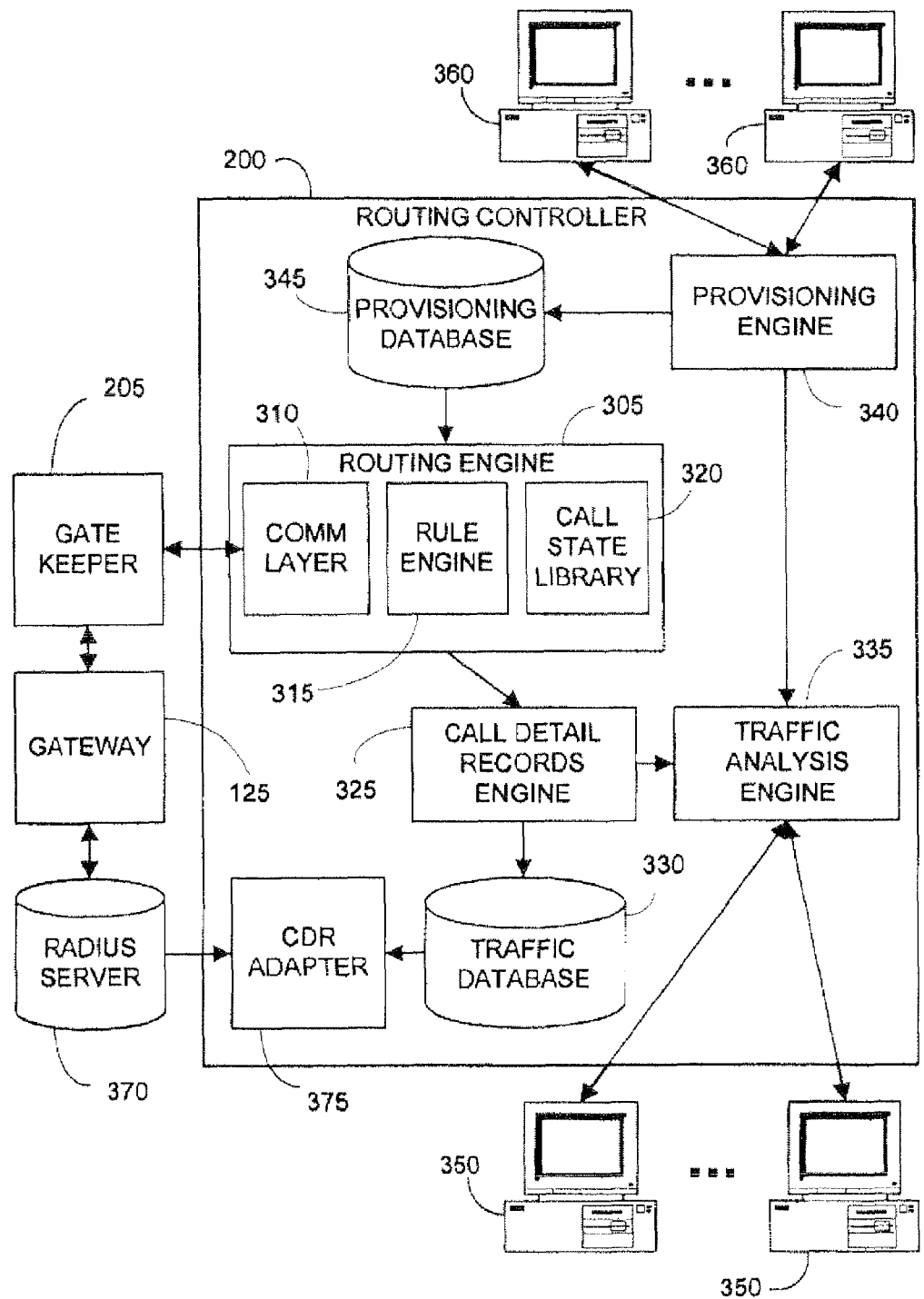
FIG. 3 is a schematic diagram of a system architecture providing unproved control for VoIP communications, according to a preferred embodiment of the invention.

As indicated in FIG. 3, a routing controller 200 may include a routing engine 305, a Call Detail Record (CDR) engine 325, a traffic database 330, a traffic analysis engine 335, a provisioning engine 340, and a provisioning database 345. The routing engine 305, CDR engine 325, traffic analysis engine 335, and provisioning engine 340 may exist as independent processes and may communicate to each other through standard interprocess communication mechanisms.

In alternative embodiments, the routing engine 305, Call Detail Record (CDR) engine 325, traffic database 330, traffic analysis engine 335, provisioning engine 340, or provisioning database 345 may be duplicated to provide redundancy. For instance, two CDR engines 325 may function in a master-slave relationship to manage the generation of billing data.

The routing engine 305 may include a communications layer 310 to facilitate an interface between the routing engine 305 and the gatekeepers 205/206. Upon receipt of a routing request from a gatekeeper, the routing engine 305 may determine the best routes for VoIP traffic based upon one or more predetermined attributes such as the selected carrier service provider, time of day, a desired Quality of Service (QoS), cost, or other factors. The routing information generated by the routing engine 305 could include a destination gateway address, and/or a preferred Internet Service Provider to use to place the call traffic into the Internet. Moreover, in determining the best route, the rule engine 315 may apply one or more exclusionary rules to candidate routes, based upon known bad routes, provisioning data from provisioning database 345, or other data.

The routing engine 305 may receive more than one request to route a single call. For example, when a first routing attempt was declined by the terminating gateway, or otherwise failed to result in a connection, or where a previous routing attempt resulted in a disconnect other than a hang-up by the originator or recipient, then the routing engine may receive a second request to route the same call. To provide redundancy, the routing engine 305 may generate alternative routes to a particular far-end destination. In a preferred embodiment of the invention, when the routing engine receives a routing request, the routing engine will return both preferred routing information, and alternative routing information. In this instance, information for at least one next-best route will be immediately available in the event of failure of the preferred route. In an alternative embodiment, routing engine 305 may determine a next-best route only after the preferred route has failed. An advantage of the latter approach is that touting engine 305 may be able to better determine the next-best route with the benefit of information concerning the most recent failure of the preferred route.

To facilitate alternative routing, and for other reasons, the routing engine 305 may maintain the state of each VoIP call in a call state library 320. For example, routing engine 305 may store the state of a call as "set up," "connected," "disconnected," or some other state.

Routing engine 305 may further format information about a VoIP call such as the originator, recipient, date, time, duration, incoming trunk group, outgoing trunk group, call states, or other information, into a Call Detail Record (CDR). Including the incoming and outgoing trunk group information in a CDR may be advantageous for billing purposes over merely including IP addresses, since IP addresses may change or be hidden, making it difficult to identify owners of far-end network resources. Routing engine 305 may store CDR's in a call state library 320, and may send CDR's to the CDR engine 325 in real time, at the termination of a call, or at other times, The CDR engine 325 may store CDR's to a traffic database 330. To facilitate storage, the CDR engine 325 may format CDR's as flat files, although other formats may also be used. The CDR's stored in the traffic database 330 may be used to generate bills for network services. The CDR engine 325 may also send CDR's to the traffic analysis engine 335.

Data necessary for the billing of network services may also be stored in a Remote Authentication Dial-In User Service (RADIUS) server 370. The RADIUS server 370 may also directly communicate with a gateway 125 to receive and store data such as incoming trunk group, call duration, and IP addresses of near-end and far-end destinations. The CDR adapter 375 may read data from both the traffic database 330 and the RADIUS server 370 to create a final CDR. The merged data supports customer billing, advantageously including information which may not be available from RADIUS server 370 alone, or the traffic database 330 alone.

The traffic analysis engine 335 may collect CDR's, and may automatically perform traffic analysis in real time, near real time, or after a predetermined delay. In addition, traffic analysis engine 335 may be used to perform post-traffic analysis upon user inquiry. Automatic or user-prompted analysis may be performed with reference to a predetermined time period, a specified outgoing trunk group, calls that exceed a specified duration, or according to any other variable(s) included in the CDR's.

The provisioning engine 340 may perform tasks necessary to route particular calls over the Internet. For example, the provisioning engine 340 may establish or modify client account information, authorize a long distance call, verify credit, assign phone numbers where the destination resides on a PSTN network, identify available carrier trunk groups, generate routing tables, or perform other tasks. In one embodiment of the invention, provisioning may be performed automatically. In another embodiment, provisioning may be performed with user input. Hybrid provisioning, that is, a combination of automated and manual provisioning, may also be performed. The provisioning engine 340 may further cause provisioning data to be stored in a provisioning database 345.

Client workstations 350 and 360 may be coupled to routing controller 200 to provide a user interface. As depicted in FIG. 3, the client(s) 350 may interface to the traffic analysis engine 335 to allow a user to monitor network traffic. The client(s) 360 may interface to the provisioning engine 340 to allow a user to view or edit provisioning parameters. In alternative embodiments, a client may be adapted to interface to both the traffic analysis engine 335 and provisioning engine 340, or to interface with other features of routing controller 200.

In a system embodying the invention, as shown in FIG. 2, the gateways 125/126 would first receive a request to set up a telephone call from the PSTN, or from a Long Distance Provider 117, or from some other source. The request for setting up the telephone call would typically include the destination telephone number. In order to determine which destination gateway should receive the packets, the gateway would consult the gatekeeper.

The gatekeeper 205, in turn may consult the routing controller 200 to determine the most appropriate destination gateway. In some situations, the gatekeeper may already have the relevant routing information. In any event, the gatekeeper would forward the routing information to the originating gateway 125/126, and the originating gateway would then send the appropriate packets to the appropriate destination gateway. As mentioned previously, the routing information provided by the gatekeeper may include just a preferred destination gateway, or it may include both the preferred destination gateway information, and information on one or more next-best destination gateways. The routing information may also include a preferred route or path onto the Internet, and one or more next-best route. The routing information may further include information about a preferred Internet Service Provider.

Figure 4:
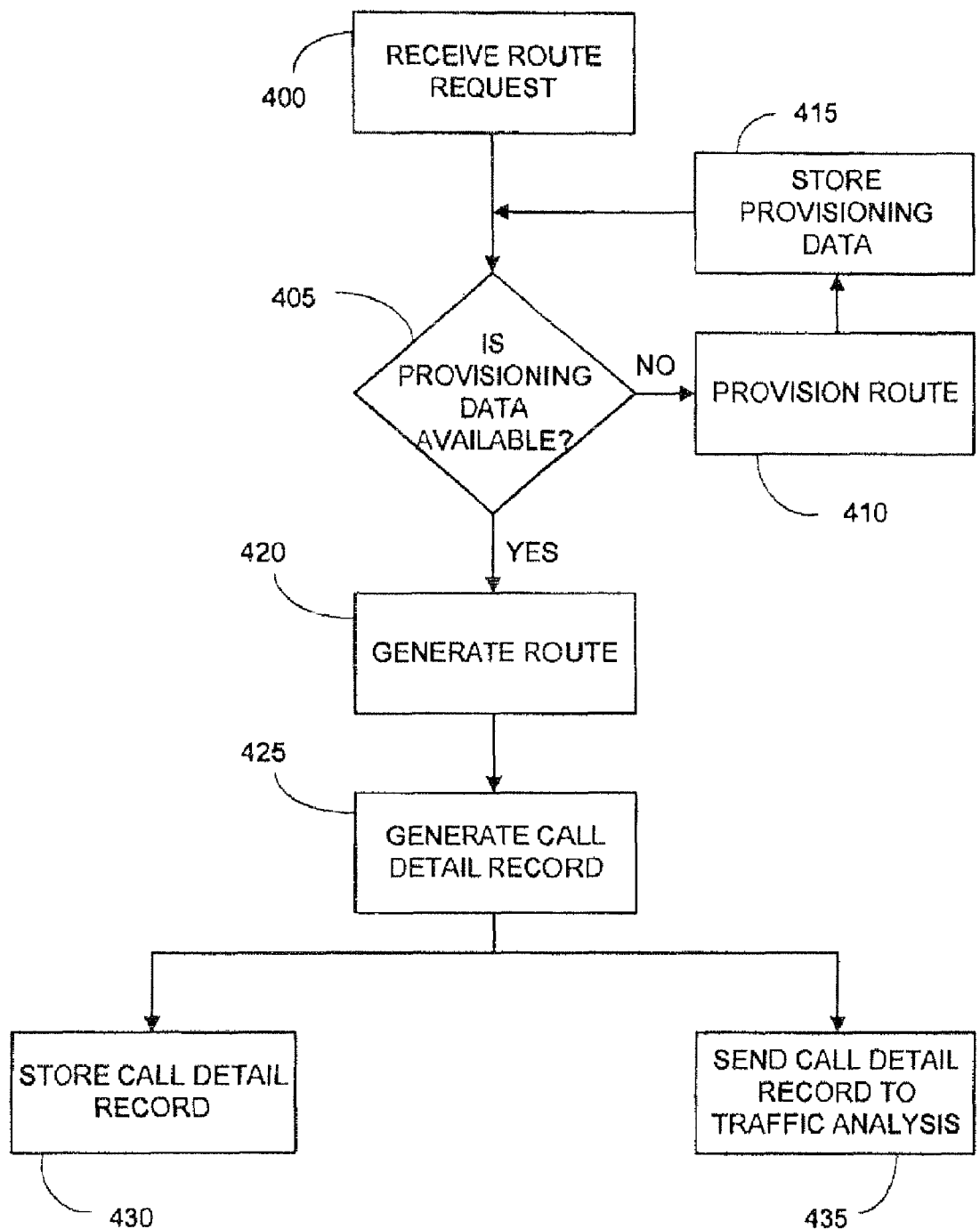
FIG. 4 is a flow diagram illustrating a method for routing control, according to a preferred embodiment of the invention.

FIG. 4 is a flow chart illustrating a method embodying the invention for using the routing controller 200. In step 400, the routing controller 200 receives a routing request from either a gatekeeper, or a gateway. In step 405, a decision is made as to whether provisioning data is available to route the call If the provisioning data is not available, the process advances to step 410 to provision the route, then to step 415 for storing the provisioning data before returning to decision step 405.

If, on the other hand, if it is determined in step 405 that provisioning data is available, then the process continues to step 420 for generating a route. In a preferred embodiment of the invention, step 420 may result in the generation of information for both a preferred route, and one or more alternative routes. The alternative routes may further be ranked from best to worst.

The routing information for a call could be simply information identifying the destination gateway to which a call should be routed. In other instances, the routing information could include information to identify the best Internet Service Provider to use to place the call traffic onto the Internet. In addition, the routing controller may know that attempting to send data packets directly from the originating gateway to the destination gateway is likely to result in a failed call, or poor call quality due to existing conditions on the Internet. In these instances, the routing information may include information that allows the data packets to first be routed from the originating gateway to one or more interim gateways, and then from the interim gateways to the ultimate destination gateway. The interim gateways would simply receive the data packets, and immediately forward the data packets on to the ultimate destination gateway.

Step 420 may also include updating the call state library, for example with a call state of "set up" once the route has been generated. Next, a CDR may be generated in step 425. Once a CDR is available, the CDR may be stored in step 430 and sent to the traffic analysis engine in step 435. In one embodiment, steps 430 and 435 may be performed in parallel, as shown in FIG. 4. In alternative embodiments, steps 430 and 435 may be performed sequentially. In yet. other embodiments, only step 430 or only step 435 may be performed.

Figure 5:
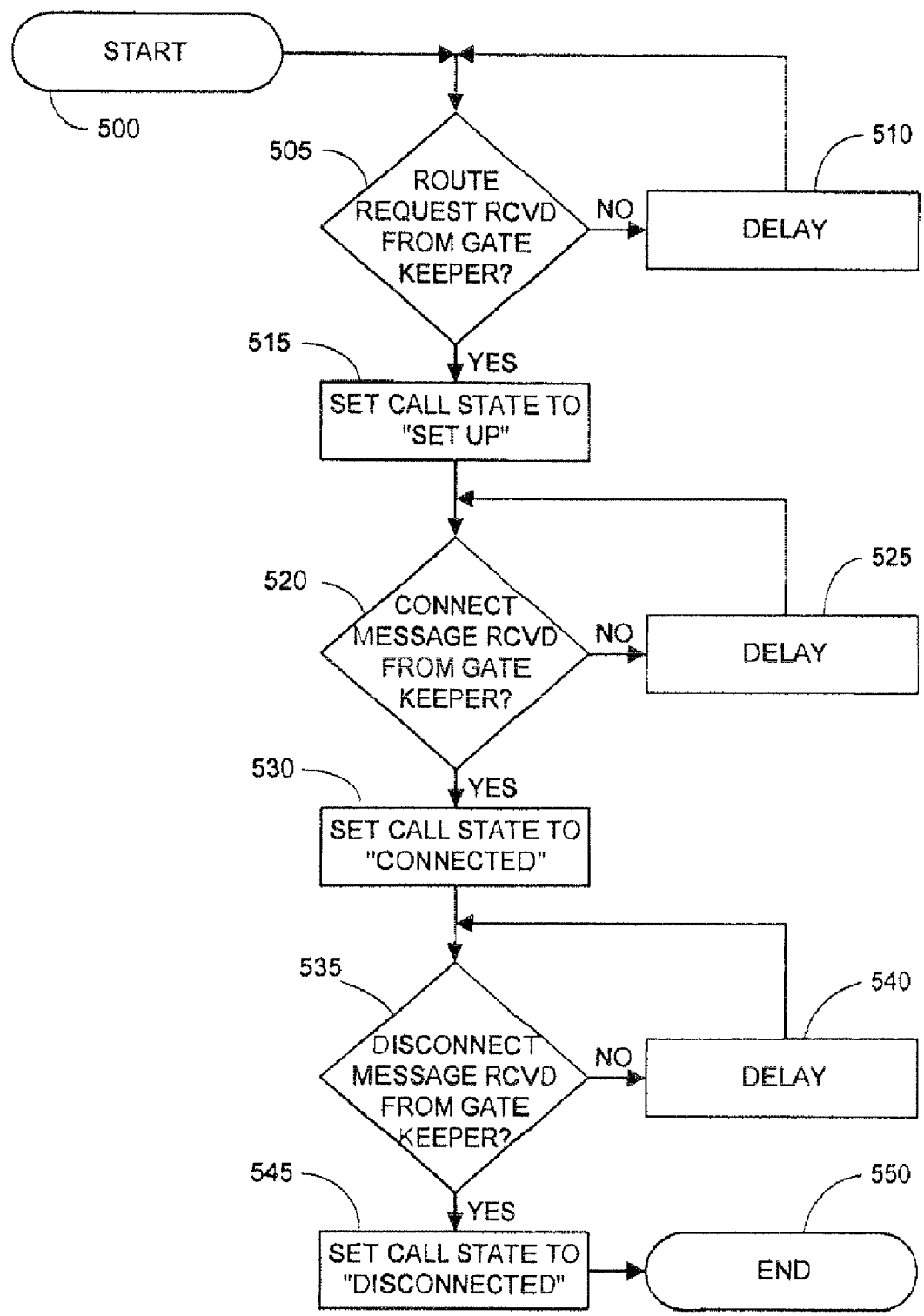
FIG. 5 is a flow diagram illustrating a method for maintaining a call state, according to a preferred embodiment of the invention.

FIG. 5 is a flow diagram illustrating a method for maintaining a call state, which may be performed by routing engine 305. After starting in step 500, the process may determine in step 505 whether a route request has been received from a gatekeeper or other source. If a routing request has not been received, the process may advance to a delay step 510 before returning to decision step 505. If, however, it is determined in step 505 that a route request has been received, then a call state may be set to "set up" in step 515.

The process of FIG. 5 may then determine in step 520 whether a connect message has been received from a gatekeeper or other source. If a connect message has not been received, the process may advance to delay step 525 before returning to decision step 520. If, however, it is determined in step 520 that a connect message has been received, then a call state may be set to "connected" in step 530.

The process of FIG. 5 may then determine in step 535 whether a disconnect message has been received from a gate keeper or other source. If a disconnect message has not been received, the process may advance to delay step 540 before returning to decision step 535. If, however, it is determined in step 535 that a disconnect message has been received, then a call state may be set to "disconnected" in step 545 before the process ends in step 550.

The process depicted in FIG. 5 will operate to keep the call state for all existing calls up to date to within predetermined delay limits. In alternative embodiments of the invention, the call state monitoring process can monitor for other call states such as "hang-up," "busy," or other call states not indicated above. Moreover, monitoring for other call states may be instead of, or in addition to, those discussed above. Further, in one embodiment, monitoring could be performed in parallel, instead of the serial method illustrated in FIG. 5.

Figure 6:
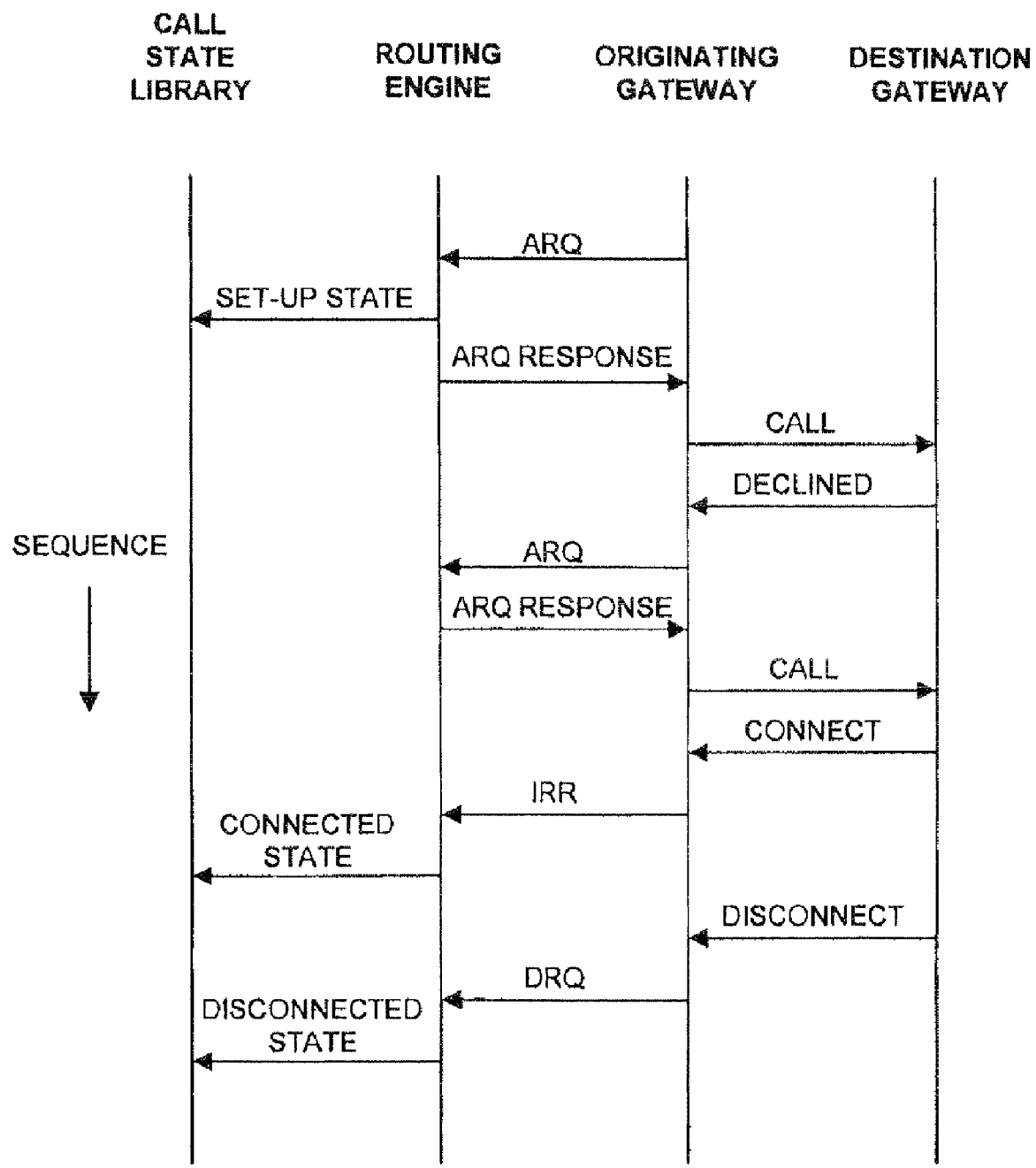
FIG. 6 is a sequence diagram illustrating a method for communicating between functional nodes of a VoIP network, according to a preferred embodiment of the invention.

FIG. 6 discloses a sequence of messages between an originating gateway, a routing engine, a call state library, and a destination gateway, according to a preferred embodiment of the invention. In operation of the network, the originating gateway may send a first request for routing information, in the form of a first Admission Request (ARQ) message, to a routing engine within a routing controller. The request would probably be passed on through a gatekeeper logically positioned between the gateway and die routing engine in the routing controller.

Upon receipt of the routing request, the routing engine may store a set-up state in call state library. The routing engine may then determine a best route based upon one or more predetermined attributes such as the selected carrier service provider, a desired Quality of Service (QoS), cost, or other factors. The routing engine may then send information pertaining to the best route to the originating gateway, possibly via a gatekeeper, as a first ARQ response message. The gateway would then initiate a first call to a destination gateway using the information contained within the response message. As shown in FIG. 6, the destination gateway may return a decline message to the originating gateway, When the originating gateway receives a decline message, the gateway may send a second request for routing information, in the form of a second ARQ message, to routing engine. Routing engine may recognize the call as being in a set up state, and may determine a next best route for completion of the call. Routing engine may then send a second ARQ response message to the originating gateway. The originating gateway may then send a second call message to the same or a newly selected destination gateway using the next best route. In response to the second call message, the destination gateway may return a connect message to the originating gateway.

The routing engine may use a conference ID feature of the H.323 protocol, which is unique to every call, in order to keep track of successive routing attempts. Thus, upon receiving a first ARQ for a particular call, routing engine may respond with a best route; upon receiving a second ARQ associated with the same call, routing engine may respond with the second best route. If the second call over the next best route does not result in a connection, the originating gateway may send a third ARQ message to routing engine, and so on, until an ARQ response message from routing engine enables a call to be established between the originating gateway and a destination gateway capable of completing the call to the called party.

In alternative embodiments of the invention, the initial ARQ response from the routing engine to the originating gateway may include information about the best route, and one or more next-best routes. In this instance, when a call is declined by one terminating gateway, the originating gateway can simply attempt to route the call using the next-best route without the need to send additional queries to the routing engine.

Once the originating gateway receives a connect message from a destination gateway, the originating gateway may send an Information Request Response (IRR) message to the routing engine to indicate the connect. In response, the routing engine may store a connected state message to the call state library.

After a call is connected, a call may become disconnected. A disconnect may occur because a party has hung up, because of a failure of a network resource, or for other reasons. In this instance, destination gateway may send a disconnect message to the originating gateway. In response, originating gateway may send a Disengage Request (DRQ) message to the routing engine. The routing engine may then update the call state by storing a disconnected state status in the call state library.

Figure 7:
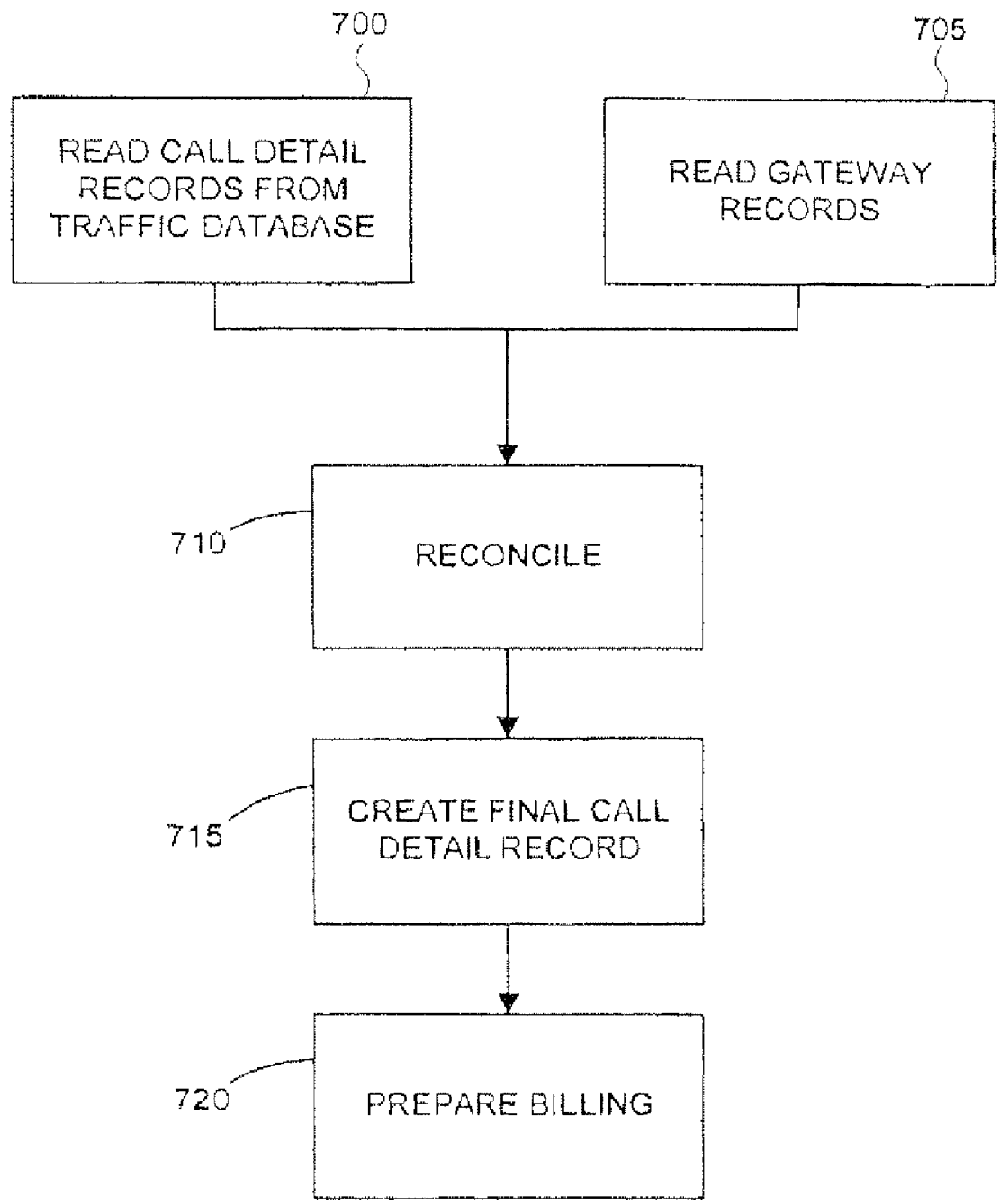
FIG. 7 is a flow diagram illustrating a method for billing in a VoIP network environment, according to a preferred embodiment of the invention.

FIG. 7 illustrates a billing process which exploits CDR data, according to a preferred embodiment of the invention. In step 700, data may be read from a traffic database which is part of the routing controller shown in FIG. 3, or which is a part of some other routing system. In step 705, gateway records may be read from a RADIUS server, as also illustrated in FIG. 3, or from some other source of gateway data. In step 710, data from the two sources is reconciled by first matching up the information for particular calls from the two sources. Information such as date, time, origination point and destination point and/or conference identifier can be used to match up information on a particular call that has been stored in two different locations.

Advantageously, CDR data from the traffic database or the routing controller, or other routing system, may provide outbound trunk group and termination trunk group information used for billing which may not be available from the gateway records read in step 705. The process would then create a final CDR for individual calls in step 715, and customer billing may be generated by a billing utility (not shown in die FIGS.) in step 720. The process of generating a final CDR may utilize pieces of information gathered from the multiple different sources. Also, when the same type of information for a call is recorded in two places, there may be rules for determining which source to use, or the information may be merged through some sort of averaging process and calculation process to arrive at a final value.

The final CDR for a call could include information identifying call status information, the start date and time, the inbound trunk group, the inbound original DNIS, the inbound translated DNIS, the outbound trunk group, the outbound translated DNIS, the inbound original ANI, the inbound translated ANI, the outbound translated ANI, the duration of the call, the number of re-routings necessary to set the call up, a disconnect cause code number, gateway IP addresses, and a re-route ID number.

Figure 8:
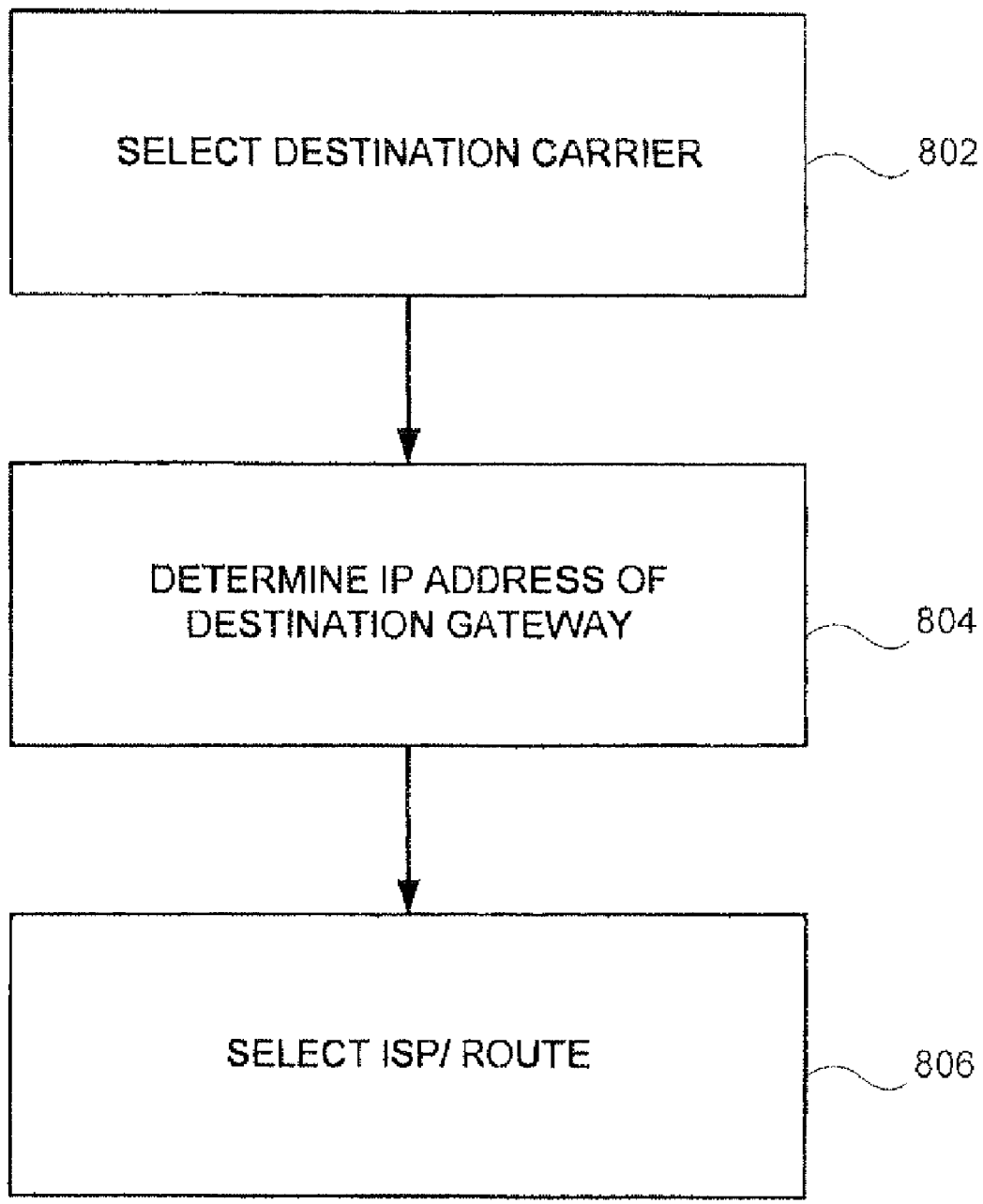
FIG. 8 is a flow diagram illustrating a three level routing method, according to a preferred embodiment of the invention.

FIG. 8 is a flow diagram illustrating a method, according to a preferred embodiment of the invention, for generating routing information in response to a touting request As shown in FIG. 8, when a routing controller (or a gatekeeper) receives a routing request from a gateway, the method first involves selecting a destination carrier that is capable of completing the call to the destination telephone in step 802. In some instances, there may be only one destination carrier capable of completing the call to the destination telephone. In other instances, multiple destination earners may be capable of completing the call. In those instances where multiple carriers are capable of completing the call, it is necessary to initially select one destination carrier. If the call is completed on the first attempt, that carrier will be used. If the first attempt to complete the call fails, the same or a different carrier may ultimately be used to complete the call.

Where there are multiple destination carriers capable of completing the call, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between the system operator and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

Once the destination carrier has been selected, the method would include identifying an IP address of a destination gateway connected to the destination carrier and capable of passing the call on to the destination carrier. The destination gateway could be operated by the system operator, or by the destination carrier, or by a third party. Typically, a table would be consulted to determine which destination gateways correspond to which destination carriers and geographic locations.

Often there may be multiple destination gateways capable of completing a call to a particular destination carrier. In this situation, the step of determining the IP address could include determining multiple destination IP addresses, each of which correspond to destination gateways capable of completing the call to the destination carrier. Also, the IP address information may be ranked in a particular order in recognition that some destination gateways may offer more consistent or superior IP quality. Also, if two or more destination gateways capable of completing a call to a destination carrier are operated by different parties, there may be cost considerations that are also used to rank the IP address information. Of course, combinations of these and other considerations could also be used to select particular destination gateways, and to thus determine the IP address(es) to which data packets should be sent.

In some embodiments of the invention, determining the IP address(es) of the terminating gateway(s) may be the end of the process. This would mean that the system operator does not care which Internet Service Provider (ISP) or which route is used to place data traffic onto the Internet. In other instances, the method would include an additional step, step 806, in which the route onto the Internet and/or the ISP would then be selected. The selection of a particular ISP may be based on a quality of service history, the cost of carrying the data, or various other considerations. The quality of service history may take into account, packet loss, latency and other IP based considerations. Also, one ISP may be judged superior at certain times of the day/week, while another ISP may be better at other times. As will be described in more detail below, the system has means for determining the quality of service that exists for various routes onto the Internet. This information would be consulted to determine which route/ISP should be used to place call data onto the Internet, Further, as mentioned above, in some instances, the routing information may specify that the call data be sent from the originating gateway to an interim gateway, and then from the interim gateway to the destination gateway. This could occur, for example, when the system knows that data packets placed onto the Internet at the originating gateway and addressed directly to the destination gateway are likely to experience unacceptable delays or packet loss.

In some instances, the quality of service can be the overriding consideration. In other instances, the cost may be the primary consideration. These factors could vary client to client, and call to call for the same client.

For example, the system may be capable of differentiating between customers requiring different call quality levels. Similarly, even for calls from a single customer, the system may be capable of differentiating between some calls that require high call quality, such as facsimile transmissions, and other calls that do not require a high call quality, such as normal voice communications. The needs and desires of customers could be determined by noting where the call originates, or by other means. When the system determines that high call quality is required, the system may eliminate some destination carriers, destination gateways, and ISPs/routes from consideration because they do not provide a sufficiently high call quality. Thus, the system may make routing decisions based on different minimum thresholds that reflect different customer needs.

Figure 9:
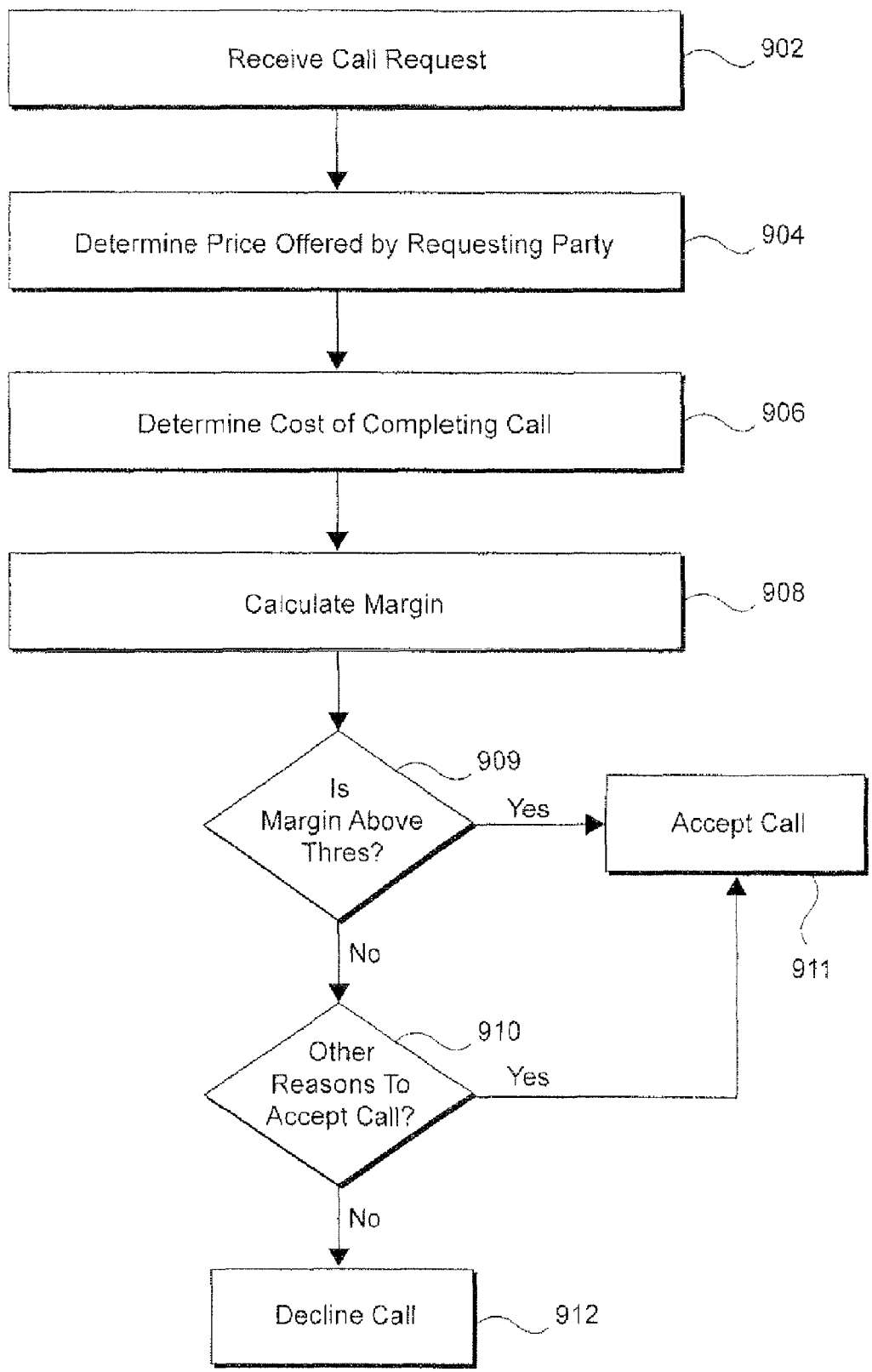
FIG. 9 is a flow diagram illustrating a method for determining whether to accept or decline a request for call completion, according to a preferred embodiment of the invention.

FIG. 9 is a flow diagram illustrating a method embodying the invention for determining whether to accept or decline a request for call completion received from the PSTN, a long distance carrier, or some other source. The process begins with receipt of a request for call completion in step 902. Thereafter, in step 904, the system would determine the price offered by a requesting carrier for completing the call. This could be done with reference, to look up tables, or the request itself could specify the price offered to complete the call. This represents the payment that the system will receive for completing the call. This can be expressed simply in cents per minute, or in some more complex fashion that represents a minimum payment for a first time period, and some additional payment for each additional minute after the first time period.

The method would then proceed to step 906, where the cost required to complete the call would be determined. The determination in step 906 may be based, at least in part, on a destination, a time of day, and a predetermined quality of service for the traffic. Also, if there are multiple ways to complete the call, this step could involve determining multiple different completion costs, each of which may depend on the destination carrier used, the destination gateways used and the ISP that is used. Until a call setup is attempted, the system may not know what the actual cost to complete the call will be. One of skill in the art will appreciate that steps 904 and 906 could be performed in any order, or simultaneously.

In step 908, the system would then calculate a margin for completing the call, or a difference between the offered price and the cost to compete the call. If the cost of completing the call is greater than the price offered, the margin will be a negative number, In step 909 the method determines whether the margin is greater than a minimum threshold. The threshold may reflect a minimum amount of money that must be made on the call to justify completing the call. The threshold may, in fact, be zero. If the margin is greater than the threshold, the method proceeds to step 911, and the call is accepted and completed. In some embodiments of the invention, this will be the end of the process, and if the result of the comparison in step 909 indicates that the margin is below the threshold, the call will be declined.

In other embodiments of the invention, if the result of the comparison in step 909 indicates that the margin is below the threshold, the method will include an additional decision step. In these embodiments, in step 910, the system will determine whether there is some other reason for accepting the call. Other reasons could include business considerations that devolve from contracts the service provider has with other carriers. For instance, if the system operator has agreed to provide a certain minimum amount of traffic to a destination service provider, the system may decide to accept and complete a call, even when it is not profitable to do so, so that the minimum traffic obligations can be satisfied. Other similar considerations may also come into play.

If the result of the decision in step 910 is that the call should be accepted for other reasons, the method proceeds to step 911, and the call is accepted and completed. If the result of the decision in step 910 is to decline the call, the method ends at step 912.

As explained above, when a routing controller receives a routing request, the routing controller returns routing information to an originating gateway which tells the originating gateway which destination gateway should receive the data packets that comprise a telephone call. As also explained above, the cost of sending a call through a particular destination service provider and/or to a particular destination gateway are factors in deciding how the call should be routed. The estimated IP quality for the route is also a factor used in deciding how to route the call. Methods embodying the invention for determining or estimating the IP quality of various routes will now be described.

Figure 10:
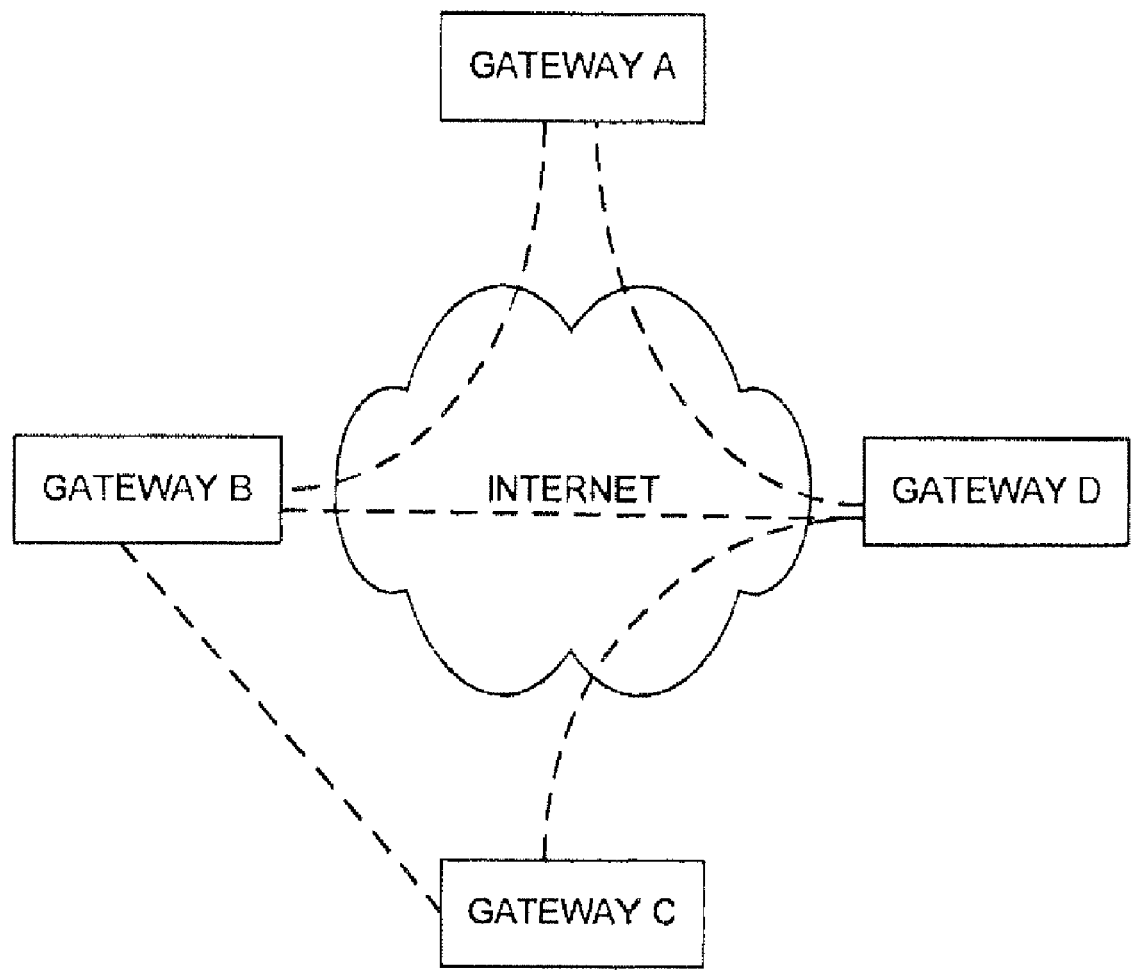
FIG. 10 is a schematic diagram of a system architecture embodying the invention.

FIG. 10 shows a conceptual diagram of four gateways with access to the Internet. Gateway A can reach Gateways B and D via the Internet. Gateway C can reach Gateway D via the Internet, and Gateway B via an external connection. Due to Internet conditions, it will often be the case that certain Gateways, while having access to the Internet, cannot reliably send data packets to other gateways connected to the Internet. Thus, FIG. 10 shows that Gateway C cannot reach Gateways B or A through the Internet. This could be due to inordinately long delays in sending data packets from Gateway C to Gateways A and B, or for other reasons.

The gateways illustrated in FIG. 10 could be gateways controlled by the system operator. Alternatively, some of the gateways could be maintained by a destination carrier, or a third party. As a result, the gateways may or may not be connected to a routing controller through a gatekeeper, as illustrated in FIG. 2. In addition, some gateways may only be capable of receiving data traffic and passing it off to a local or national carrier, while other gateways will be capable of both receiving and originating traffic.

Some conclusions logically flow from the architecture illustrated in FIG. 10. For instance, Gateway B can send data traffic directly to Gateway D through the Internet, or Gateway B could choose to send data to Gateway D by first sending the traffic to Gateway A, and then having Gateway A forward the traffic to Gateway D. In addition, Gateway B could send the traffic to Gateway C via some type of direct connection, and then have Gateway C forward the data on to Gateway D via the Internet.

The decision about how to get data traffic from one gateway to another depends, in part, on the quality of service that exists between the gateways. The methods embodying the invention that are described below explain how one can measure the quality of service between gateways, and then how the quality measurements can be used to make routing decisions.

As is well known in the art, a first gateway can "ping" a second gateway. A "ping" is a packet or stream of packets sent to a specified IP address in expectation of a reply. A ping is normally used to measure network performance between the first gateway and the second gateway. For example, pinging may indicate reliability in terms of a number of packets which have been dropped, duplicated, or re-ordered in response to a pinging sequence. In addition, a round trip time or average round trip time can provide a measure of system latency.

In some embodiments of the invention, the quality of service measurements may be based on an analysis of the round trip of a ping. In other embodiments, a stream of data packets sent from a first gateway to a second gateway could simply be analyzed at the second gateway. For instance, numbered and time-stamped data packets could be sent to the second gateway, and the second gateway could determine system latency and whether packets were dropped or reordered during transit. This information could then be forwarded to the touting controller so that the information about traffic conditions between the first and second gateways is made available to the first gateway.

A system as illustrated in FIG. 10 can use the data collected through pings to compare the quality and speed of a communication passing directly between a first gateway and a second gateway to the quality and speed of communications that go between the first and second gateways via a third or intermediate gateway. For instance, using the system illustrated in FIG. 10 as an example, the routing controller could hold information about traffic conditions directly between Gateway B and Gateway D, traffic conditions between Gateway B and Gateway A, and traffic conditions between Gateway A and Gateway D. If Gateway B wants to send data packets to Gateway D, the routing controller could compare the latency of the route directly from Gateway B to Gateway D to the combined latency of a route that includes communications from Gateway B to Gateway A and from Gateway A to Gateway D. Due to local traffic conditions, the latency of the path that uses Gateway A as an interim Gateway might still be less than the latency of the direct path from Gateway B to Gateway D, which would make this route superior.

In methods embodying the invention, each gateway capable of directly accessing another gateway via the Internet will periodically ping each of the other gateways. The information collected from the pings is then gathered and analyzed to determine one or mote quality of service ratings for the connection between each of the gateways. The quality of service ratings can then be organized into tables, and the tables can be used to predict whether a particular call path is likely to provide a given minimum quality of service.

A quality of service measure would typically be calculated using the raw data acquired through the pinging process. As is well known to those of skill in the art, there are many different types of data that can be derived from the pinging itself, and there is an almost infinite variety of ways to combine this data to calculate different quality of service measures.

FIG. 11 is a diagram of a matrix of quality of service data that indicates the quality of service measured between 10 different gateways, gateways A-J. This table is prepared by having each of the gateways ping each of the other gateways. The data collected at a first gateway is then collected and used to calculate a quality of service rating between the first gateway and each of the other gateways. A similar process of collection and calculation occurs for each of the other gateways in the system. The calculated quality of service values are then inserted into the matrix shown in FIG. 11. For instance, the quality measure value at the intersection of row A and column D is 1.8. Thus, the value of 1.8 represents the quality of service for communications between Gateways A and D. When an X appears in the matrix, it means that no communications between the row and column gateways was possible the last time the pings were collected.

Although only a single value is shown in the matrix illustrated in FIG. 11, multiple quality of service values could be calculated for communications between the various gateways. In other words, multiple values might be stored at each intersection point in the matrix. For instance, pings could be used to calculate the packet loss (PL), latency (LA), and a quality of service value (Q) which is calculated from the collected pinging data. In this instance, each intersection in the matrix would have an entry of "PL, LA, Q". Other combinations of data could also be used in a method and matrix embodying the invention.

The pinging, data collection and calculation of the values shown in the matrix could be done in many different ways. Two alternative methods are illustrated in FIGS. 12A and 12B.

Figure 12A:
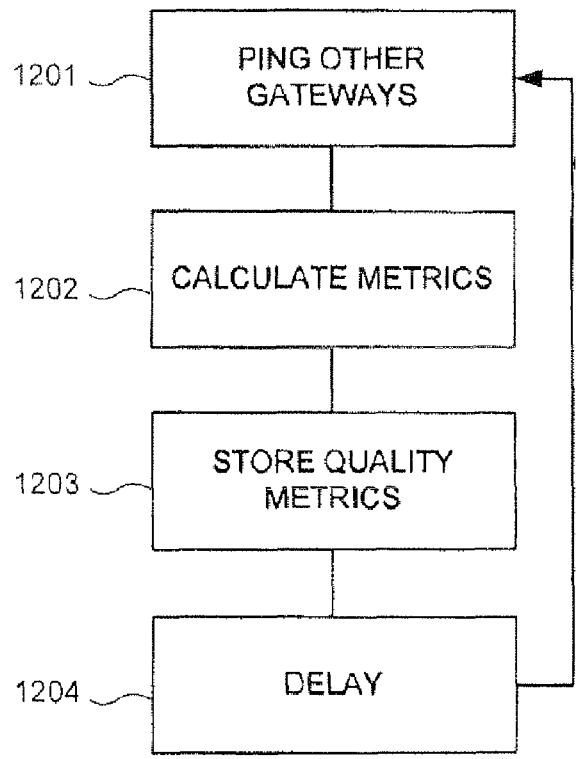
FIGS. 12A and 12B are flow diagrams of alternate methods of obtaining quality of service data for alternate communications paths.

In the method shown in FIG. 12A, pinging occurs in step 1201. As discussed above, this means that each gateway pings the other gateways and the results are recorded. In step 1202, the data collected during the pinging step is analyzed and used to calculate various quality measures. In step 1203, the quality metrics are stored into the matrix. The matrix can then be used, as discussed below, to make routing decisions. In step 1204, the method waits for a predetermined delay period to elapse. After the delay period has elapsed, the method returns to step 1201, and the process repeats.

It is necessary to insert a delay into the method to avoid excessive pinging from occurring. The traffic generated by the pinging process takes up bandwidth that could otherwise be used to carry actual data traffic. Thus, it is necessary to strike a balance between conducting the pinging often enough to obtain accurate information and freeing up the system for actual data traffic.

Figure 12B:
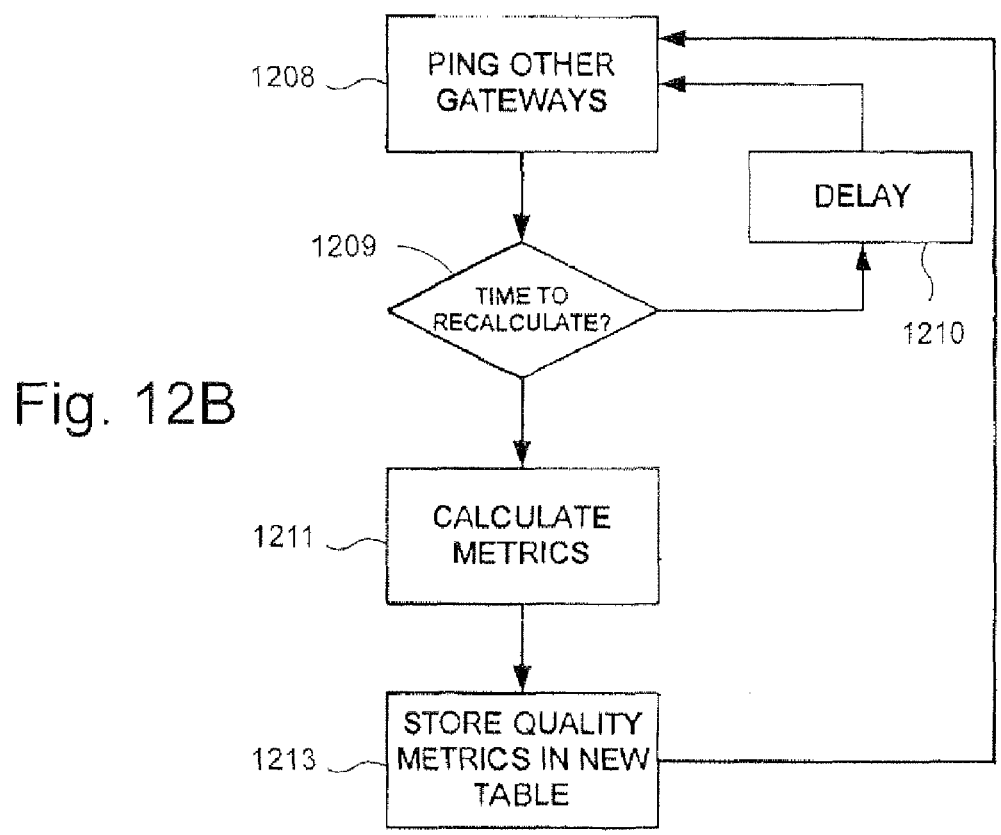

The alternate method shown in FIG. 12B begins at step 1208 when the pinging process is conducted. Then, in step 1209, the system determines whether it is time to re-calculate all the quality of service metrics. This presupposes that the matrix will only be updated at specific intervals, rather than each time a pinging process is conducted. If it is not yet time to update the matrix, the method proceeds to step 1210, where a delay period is allowed to elapse. This delay is inserted for the same reasons discussed above. Once the delay period has elapsed, the method returns to step 1208 where the pinging process is repeated.

If the result of step 1209 indicates that it is time to recalculate the quality metrics, the method proceeds to step 1211, where the calculations are performed. The calculated quality metrics are then stored in the matrix in step 1213, and the method returns to step 1208. In this method, the matrix is not updated as frequency, and there is not as high a demand for performing the calculations. This can conserve valuable computer resources, in addition, with a method as illustrated in FIG. 12B, there is data from multiple pings between each of the gateways for use in making the calculations, which can be desirable depending on the calculations being performed.

In either of the methods described above, the data used to calculate the quality metrics could include only the data recorded since the last calculations, or additional data recorded before the last set of quality metrics were calculated. For instance, pinging could occur every five minutes, and the quality metrics could be calculated every five minutes, but each set of calculations could use data recorded over the last hour.

Figure 13:
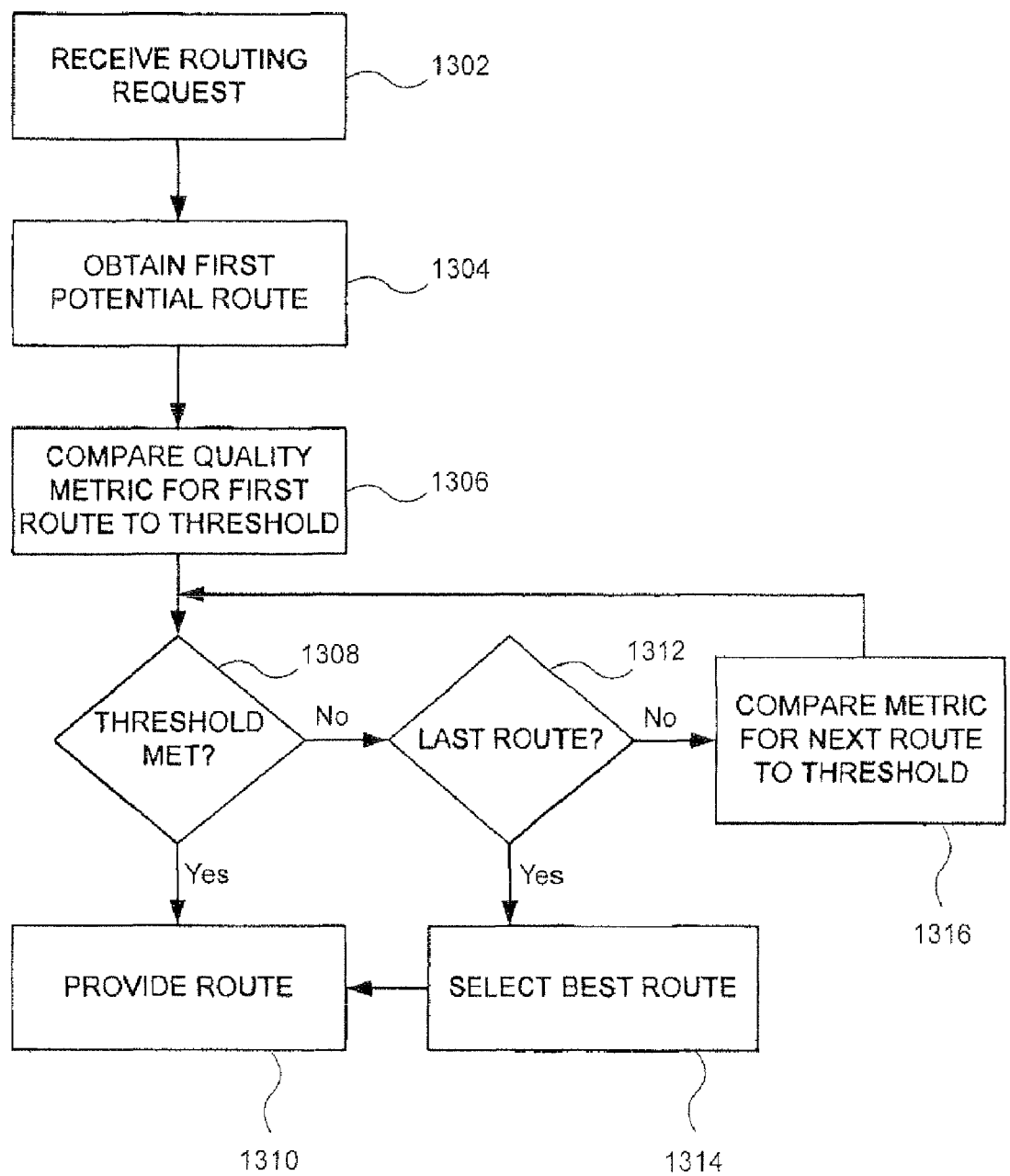
FIG. 13 is a flow diagram of a method for making routing decisions according to a preferred embodiment of the present invention.

FIG. 13 illustrates a method embodying the invention for selecting and providing routing information to a gateway making a routing request. This method would typically be performed by the gatekeeper connected to a gateway, or by the routing controller.

In step 1302, a routing request would be received. In step 1304, the system would obtain a first potential route. This step could involve all of the considerations discussed above relating to the selection of a destination carrier and/or destination gateway and/or an ISP or route between the originating gateway and the destination gateway.

Once the first potential route is determined, in step 1306 the system would look up the quality metrics associated with communications between the originating and destination gateways. This would involve consulting the quality matrix discussed above. One or more quality values in the matrix relating to the first proposed route would be compared to a threshold value in step 1308. If the quality for the first route satisfies the threshold, the method would proceed to step 1310, and the route would be provided to the requesting gateway as a potential route for completion of a call.

If the result of comparison step 1308 indicates that the quality of service metrics for the first route do not satisfy the threshold, then in step 1312 the system would determine if this is the last available route for completing the call. If so, the method would proceed to step 1314, where the best of the available routes would be determined by comparing the quality metrics for each of the routes considered thus far. Then the method would proceed to step 1310, where the best available route would be provided to the requesting gateway.

If the result of step 1312 indicates that there are alternative routes available, the method would proceed to step 1316, where the quality metrics for the next available mute would be compared to the threshold value. The method would then proceed to step 1308 to determine if the threshold is satisfied.

A method like the one illustrated in FIG. 13 could be used to identify multiple potential routes for completing a call that all satisfy a basic threshold level of service. The quality metrics associated with each route could then be used to rank the potential routes. Alternatively, the cost associated with each route could be used to rank all routes satisfying the minimum quality of service threshold. In still other alternative embodiments, a combination of cost and quality could be used to rank the potential routes. As explained above, the tanked list of potential routes could then be provided to the requesting gateway.

As also explained above, in providing a route to a gateway, the routing controller may specify either a direct route between the gateways, or a route that uses an interim gateway to relay data packets between an originating and destination gateway. Thus, the step of identifying a potential route in step 1304 could include identifying both direct routes, and indirect routes that pass through one or more interim gateways. When interim gateways are used, the quality metrics for the path between the originating gateway and the interim gateway and the path between the interim gateway and the destination gateway would all have to be considered and somehow combined in the comparison step.

In a system embodying the invention, as shown in FIG. 2, multiple different gateways are all routing calls using routing information provided by the routing controller 200. The routing information stored in the routing controller includes tables that are developed using the methods described above. The routing table indicates the best available routes between any two gateways that are connected to the system. Even when there are multiple routing controllers that are a part of the system, all routing controllers normally have the same touting table information. This means that each time a gateway asks for a route to a destination telephone number, the routing information returned to the gateway will be the same, regardless of which gateway made the routing request. As will be explained below, in prior art systems, the fact that all gateways receive the same routing information can lead to unnecessary signaling and looping of call setup requests.

Figure 14:
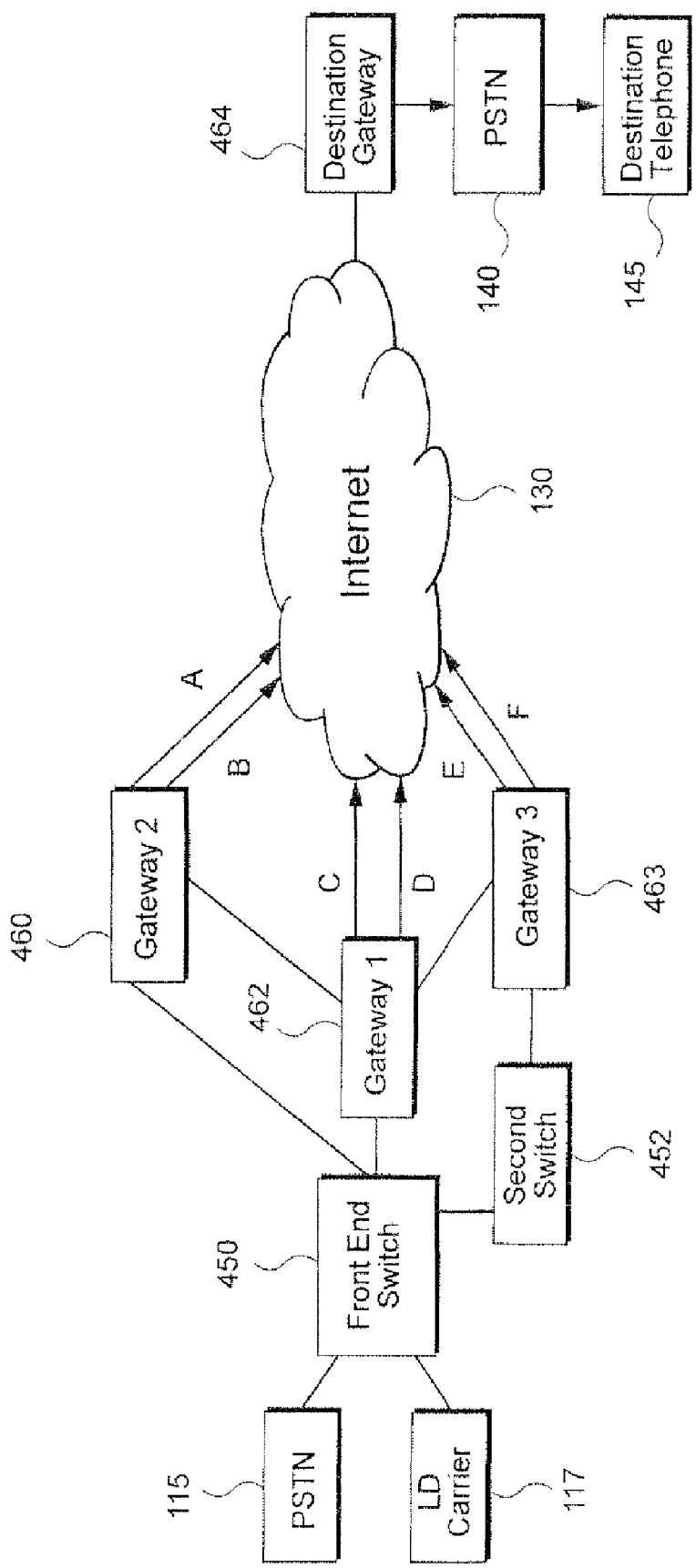
FIG. 14 is a schematic diagram of a system architecture for routing traffic over the Internet, according to a preferred embodiment of the present invention.

FIG. 14 shows the basic architecture of a system embodying the invention. As shown therein, the PSTN 115 and/or a long distance carrier 117 both deliver calls to a front end switch 450 of the system. The calls arrive at the front end switch 450 as basically a request to complete a call to the destination telephone 145. The front end switch must then forward the call on to an available gateway that can convert the call into digital data packets and place the packets onto the Internet properly addressed to the destination gateway 464. The front end switch could send the call directly to gateway 1 462, or directly to gateway 2 460. Alternatively, the front end switch 450 could send the call to a second switch 452, and the second switch could then send the call to gateway 3 463.

Each of the individual gateways can place data traffic onto the Internet using one or more routes or access points. In the system illustrated in FIG. 14, gateway 1 462 can place traffic onto the Internet using route C or route D. Gateway 2 460 can place traffic onto the Internet using routes A and B. Gateway 3 463 can place traffic onto the Internet using routes E and F. At any given point in time, one or more of these routes could become inoperative, or simply degraded in performance to the point that making a voice call through the route results in poor call quality.

In prior art systems, when the front end switch 450 receives a call request for a call intended for the destination telephone 145 from either the PSTN 115 or the long distance carrier 117, the front end switch would forward the call to one of the gateways so that the call setup procedures could be carried out. For purposes of explanation, assume that the call request is forwarded to Gateway 1 462. The gateway would then make a routing request to the routing controller for information about the address of the destination gateway, and the most preferable route to use to get the data onto the Internet. Again, for purposes of explanation, assume that the routing controller responds with the appropriate address of the destination gateway 464, and with the information that the best routes, in preferred order, are routes C, then A, and then E.

With this information, gateway 1 462 would first try to set the call up to go to the destination gateway 464 via route C. Assume that for whatever reason, route C fails. Gateway 1 would then consult the routing information again and determine that the next best route is route A. Thus, gateway 1 would forward the call on to gateway 2 460, which is capable of using route A.

When gateway 2 460 receives the call request, it too will consult the routing controller for routing information. The same information will be returned to gateway 2460, indicating that the preferred routes are C, then A, then E. With this information, gateway 2 460 believes that route C is the best route, so gateway 2460 would bounce the call request back to gateway 1 462, so that the call could be sent through route C. Gateway 1 would receive back the same call request it just forwarded on to gateway 2. Depending on the intelligence of gateway 1, gateway 1 might immediately send a message to gateway 2 indicating that route C has already been attempted and that this route failed. Alternatively, gateway 1 might again try to send the call via route C. Again the route would fail. Either way, the call request would ultimately be bounced back to gateway 2 with an indication that the call could not be sent through route C.

When gateway 2 gets the call request back from gateway 1, it would then consult its routing information and determine that the next route to try is route A. If route A is operable, the call could then be setup between gateway 2 and the destination gateway 464 via route A. Although this process eventually results in a successful call setup, there is unnecessary call signaling back and forth between gateway 1 and gateway 2.

Moreover, if gateway 2 is unable to set up the call through route A, gateway 2 would again consult the routing information it received earlier, and gateway 2 would send the call to gateway 3 463 so that the call can be placed onto the Internet using route E. When gateway 3 receives the call request from gateway 2, it too would consult the routing controller and learn that the preferred routes are route C, then route A, then route E. With this information, gateway 3 would forward the call request back to gateway 1 with instructions to place the call through route C, which would fail again. Gateway 1 would then forward the call back to gateway 3. Gateway 3 would then try to complete that call using gateway 2 and route A. This too would fail. Finally, gateway 3 would send the call out using route E.

Because each of the gateways ate using the same routing information, when one or more routes fail, there can be a large amount of unnecessary looping and message traffic between the gateways as the a call request is passed back and forth between the gateways until the call is finally placed through an operative route. In preferred embodiments of the invention, special routing procedures are followed to reduce or eliminate unnecessary looping.

In a first embodiment, each of the gateways will know which routes are associated with each gateway. Alternatively, this information may be provided by the routing controller as needed. This means that gateway 2 would know that gateway 1 uses routes C and D, and that gateway 3 uses routes E and F. The gateways can then use this information to reduce or eliminate unnecessary looping.

For instance, using the same example as described above, when a call request comes in to place a call to destination telephone 145, gateway 1 would first try to send the call via route C. When that route fails, gateway 1 would send the call request to gateway 2 so that gateway 2 could send the call via route A. In the prior art system, gateway 2 would have bounced the call request back to gateway 1 because gateway 2 would believe that route C is the best way to route that call. But in a system embodying the invention, gateway 2 would know that gateway 1 uses route C. With this knowledge, and knowing that the call request came from gateway 1, gateway 2 would conclude that gateway 1 must have already tried to use route C, and that route C must have failed. Thus, rather than bouncing the call request back to gateway 1, gateway 2 would simply try the next best route, which would be route A. Similar logic can be used at each of die other gateways to eliminate unnecessary looping.

In another preferred embodiment, special addressing information can be included in the messages passing back and forth between the gateways. For instance, and again with reference to the same example described above, assume that gateway 1 first gets a call request to complete a call to destination telephone 145. Gateway 1 would try to send the call via route C, and route C would fail. At this point, gateway 1 would know that the next best route is route A. In this embodiment, before sending the call request on to gateway 2, gateway 1 could encode a special addressing message into the call request. The special addressing message would inform gateway 2 that the call request should be sent via a specific route. In the example, gateway 1 would include addressing codes that indicate that the call request should be sent via route A, since that is the next best route.

When gateway 2 receives the call request, it would read the special routing information and immediately know that the call should be sent via route A. If route A is operable, the call will immediately be sent out using route A. If route A is not available, gateway 2 would consult the routing controller and determine that the next route to try is route E. Gateway 2 would then send the call request on to gateway 3 with special addressing information that tells gateway 3 to immediately try to place the call using route E. In this manner, unnecessary looping can be eliminated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of deciding whether to complete a long distance telephone call between an originating carrier and a destination telephone, comprising:

determining if completing the telephone call would fulfill contractual obligations owed to a destination carrier capable of completing the telephone call to the destination telephone; and deciding, with one or more routing controllers, whether to complete the telephone call or to decline the telephone call based on the result of the determining step, based on a payment that would be received from the originating carrier for completing the call, and based on the cost of completing the call through the at least one destination carrier, wherein the deciding step results in a decision to complete the telephone call if completing the call would fulfill a contractual obligation owed to the at least one destination carrier, and the cost of completing the call is greater than the payment that would be received from the originating carrier by less than a predetermined threshold amount.

2. The method of claim 1, wherein the determining step comprises:
   identifying at least one destination carrier capable of completing the telephone call to the destination telephone; and
   determining whether completing the telephone call through the at least one destination carrier would fulfill contractual obligations owed to the at least one destination carrier.

3. The method of claim 2, wherein the step of determining whether completing the telephone call through the at least one destination carrier would fulfill contractual obligations comprises determining if completing the telephone call through the at least one destination carrier would count towards fulfilling a minimum guarantee made to the at least one destination carrier.

4. The method of claim 3, wherein the determining step comprises determining if completing the call through the at least one destination carrier would count towards fulfilling a guarantee of completing a certain number of call minutes per unit of time through the at least one destination carrier.

5. The method of claim 3, wherein the determining step comprises determining if completing the call through the at least one destination carrier would count towards a fulfilling a guarantee of spending a certain minimum amount of money for calls completed through the at least one destination carrier per unit of time.

6. The method of claim 1, wherein the deciding step results in a decision to reject the telephone call if completing the call would fulfill a contractual obligation owed to the at least one destination carrier, and the cost of completing the call is greater than the payment that would be received from the originating carrier by more than a predetermined threshold amount.

7. The method of claim 1, wherein the deciding step results in a decision to reject the telephone call if the cost of completing the call is greater than the payment that would be received from the originating carrier for completing the call, and completing the call would not fulfill a contractual obligation owed to the at least one destination carrier.

8. A method of deciding whether to complete a long distance telephone call between an originating carrier and a destination telephone, comprising:
   determining the cost of completing the telephone call to the destination telephone through a destination carrier;
   determining the amount that the originating carrier would pay for completion of the telephone call to the destination telephone;
   determining a profit margin that will result if the telephone call is completed to the destination telephone;
   determining if completing the telephone call to the destination telephone would fulfill a contractual obligation owed to the destination carrier; and
   deciding, with one or more routing controllers, whether to complete the telephone call or to reject the telephone call based on the determined profit margin and based on whether completing the telephone call would satisfy a contractual obligation owed to the destination carrier, wherein the deciding step results in a decision to complete the telephone call if the profit margin is negative by less than a predetermined threshold amount, but completing the call would result in the fulfillment of a contractual obligation owed to the destination carrier.

9. The method of claim 8, wherein the deciding step results in a decision to not complete the telephone call if completing the call would result in the fulfillment of a contractual obligation owed to the destination carrier, but the profit margin is negative by more than a predetermined threshold amount.

10. The method of claim 8, wherein the step of determining if completing the telephone call to the destination telephone would fulfill a contractual obligation owed to the destination carrier comprises determining if completing the telephone call through the destination carrier would count towards satisfying a guarantee to complete a minimum number of calling minutes per unit of time through the destination carrier.

11. The method of claim 8, wherein the step of determining if completing the telephone call to the destination telephone would fulfill a contractual obligation owed to the destination carrier comprises determining if completing the telephone call through the destination carrier would count towards satisfying a guarantee to pay the destination carrier a certain minimum amount per unit of time for carrying telephone calls.

12. A method of deciding whether to complete a telephone call between an originating carrier and a destination telephone, comprising:
   determining an amount that the originating carrier will pay for completion of the telephone call to the destination telephone;
   determining the cost to complete the telephone call between the originating carrier and the destination telephone;
   determining a profit margin for completing the telephone call from the originating carrier to the destination telephone;
   determining if there are business reasons for completing the telephone call between the originating carrier and the destination telephone other than profit; and
   deciding, with one or more routing controllers, whether to complete the telephone call between the originating carrier and the destination telephone based on the determined profit margin and based on whether there are business reasons for completing the telephone call other than profit, wherein the deciding step results in a decision to complete the telephone call if the profit margin is below a first threshold value, and there are business reasons for completing the telephone call other than profit.

13. The method of claim 12, wherein the deciding step results in a decision to not complete the telephone call if there are business reasons for completing the telephone call other than profit, but the profit margin is below a second threshold value.

14. The method of claim 12, wherein the step of determining the cost to complete the telephone call comprises determining the cost to complete the telephone call through a destination carrier, and wherein the step of determining if there are business reasons for completing the telephone call other than profit comprises determining if completing the telephone call through the destination carrier would satisfy a contractual obligation owed to the destination carrier.

15. The method of claim 12, wherein the step of determining if there are business reasons for completing the telephone call other than profit comprises determining if completing the telephone call would satisfy a contractual obligation owned to the originating carrier.

16. A method of deciding whether to complete a long distance telephone call between an originating carrier and a destination telephone, comprising:
   determining if completing the telephone call would fulfill contractual obligations owed to a destination carrier capable of completing the telephone call to the destination telephone; and
   deciding, with one or more routing controllers, whether to complete the telephone call or to decline the telephone call based on the result of the determining step, based on a payment that would be received from the originating carrier for completing the call, and based on the cost of completing the call through the at least one destination carrier, wherein the deciding step results in a decision to reject the telephone call if completing the call would fulfill a contractual obligation owed to the at least one destination carrier, and the cost of completing the call is greater than the payment that would be received from the originating carrier by more than a predetermined threshold amount.

* * * * *